(12) United States Patent
Guo

(10) Patent No.: US 12,353,359 B2
(45) Date of Patent: Jul. 8, 2025

(54) FILE SHARING METHOD AND ELECTRONIC DEVICE

(71) Applicant: HUAWEI TECHNOLOGIES CO., LTD., Shenzhen (CN)

(72) Inventor: Yubing Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/246,184

(22) PCT Filed: Sep. 14, 2021

(86) PCT No.: PCT/CN2021/118352
§ 371 (c)(1),
(2) Date: Mar. 22, 2023

(87) PCT Pub. No.: WO2022/068578
PCT Pub. Date: Apr. 7, 2022

(65) Prior Publication Data
US 2023/0342335 A1    Oct. 26, 2023

(30) Foreign Application Priority Data

Sep. 30, 2020    (CN) .......................... 202011063258.8

(51) Int. Cl.
*G06F 16/176*    (2019.01)
*G06F 3/14*    (2006.01)
(Continued)

(52) U.S. Cl.
CPC .......... *G06F 16/176* (2019.01); *G06F 16/182* (2019.01)

(58) Field of Classification Search
CPC ...... G06F 16/176; G06F 16/182; G06F 9/543; G06F 3/1454; G06F 9/54; G09G 2354/00
See application file for complete search history.

(56) References Cited

U.S. PATENT DOCUMENTS

2012/0089906 A1* 4/2012 Reeves ................. H04L 67/131
715/255
2013/0332723 A1* 12/2013 Tan ......................... G06F 21/31
713/150
(Continued)

FOREIGN PATENT DOCUMENTS

CN    106687932 A    5/2017
CN    107861781 A    3/2018
(Continued)

*Primary Examiner* — Robert W Beausoliel, Jr.
*Assistant Examiner* — Mohammad S Bhuyan

(57) ABSTRACT

A file sharing method and an electronic device are disclosed. In the method, a first electronic device displays, in response to a first operation, an application associated with a first file in a first device set. The application includes a first application on a second electronic device. The first electronic device sends an identifier of the first file and an identifier of the first application to the second electronic device in response to an operation that a user selects the first application, so that the second electronic device opens the first file by using the first application. According to the method, more types of files are quickly and conveniently shared with another electronic device in a cross-device manner and are opened by using an associated application.

16 Claims, 28 Drawing Sheets

(51) Int. Cl.
    *G06F 9/54*     (2006.01)
    *G06F 16/182*     (2019.01)

(56) References Cited

U.S. PATENT DOCUMENTS

| | | | | |
|---|---|---|---|---|
| 2014/0351215 A1* | 11/2014 | Xu | ............... | G06F 9/452 |
| | | | | 707/634 |
| 2015/0006653 A1* | 1/2015 | Shin | ............... | H04L 65/403 |
| | | | | 709/206 |
| 2015/0186538 A1* | 7/2015 | Yan | ............... | G06F 40/12 |
| | | | | 707/722 |
| 2016/0330251 A1* | 11/2016 | Lee | ............... | G09B 5/12 |
| 2017/0083182 A1* | 3/2017 | Singh | ............... | G06F 3/0482 |
| 2018/0165447 A1* | 6/2018 | Soman | ............... | G06F 9/45508 |
| 2019/0179916 A1* | 6/2019 | Sivaji | ............... | G06F 16/34 |
| 2019/0222631 A1* | 7/2019 | Li | ............... | H04L 67/06 |
| 2020/0201823 A1* | 6/2020 | Meschkat | ............... | G06F 16/178 |

FOREIGN PATENT DOCUMENTS

| | | | |
|---|---|---|---|
| CN | 111666055 | A | 9/2020 |
| CN | 112463418 | A | 3/2021 |
| EP | 3038328 | A1 | 6/2016 |

* cited by examiner

FILE SHARING METHOD AND ELECTRONIC DEVICE

CROSS-REFERENCE TO RELATED APPLICATIONS

This application is a national stage of International Application No. PCT/CN2021/118352, filed on Sep. 14, 2021, which claims priority to Chinese Patent Application No. 202011063258.8, filed on Sep. 30, 2020. Both of the aforementioned applications are hereby incorporated by reference in their entireties.

TECHNICAL FIELD

This application relates to the field of communication technologies, and in particular, to a file sharing method and an electronic device.

BACKGROUND

With development of the intelligent terminal industry, persons gradually own more types of terminal devices, and there are more scenarios in which users switch between different electronic devices and uses the electronic devices in a collaborative manner. For example, a movie downloaded in a mobile phone is played by using a video playing application in a television, or a document edited on a tablet computer is printed by using a printing program in a computer. To implement collaboration between electronic devices, a file needs to be shared between different applications in different devices.

Currently, during cross-device file sharing, a data stream of a media file may be sent in a projection manner in real time to another electronic device for playing.

However, when cross-device file sharing is performed in this manner, displaying of only a file in a media format such as a picture, a video, or audio on the another electronic device can be supported, and a file in a type such as a document or a compressed package cannot be directly opened on the another electronic device.

SUMMARY

This application provides a file sharing method and an electronic device, to share more types of files with another electronic device in a cross-device manner and open the files.

According to a first aspect, this application provides a file sharing method, including: A first electronic device displays, in response to a first operation, an application associated with a first file in a first device set, where the application includes a first application on a second electronic device. The first electronic device sends an identifier of the first file and an identifier of the first application to the second electronic device in response to an operation that a user selects the first application, so that the second electronic device opens the first file by using the first application.

In the foregoing embodiment, the first electronic device may send the first file associated with the first application to the first application on the second electronic device for opening, and applications supporting a same projection protocol do not need to be installed in two electronic devices that perform cross-device file sharing. More types of files are quickly and conveniently shared with another electronic device in a cross-device manner and are opened by using an associated application.

With reference to some embodiments of the first aspect, in some embodiments, before the step in which a first electronic device displays an application associated with a first file in a first device set, the method further includes: The first electronic device determines an electronic device that is in the first device set and that forms a distributed file system with the first electronic device. That a first electronic device displays an application associated with a first file in a first device set specifically includes: The first electronic device displays the application associated with the first file in the first device set, and preferentially displays an application on the electronic device that forms the distributed file system with the first electronic device.

In the foregoing embodiment, the first electronic device may preferentially display the application on the electronic device that forms the distributed file system with the first electronic device, to improve file sharing efficiency.

With reference to some embodiments of the first aspect, in some embodiments, that the first electronic device sends an identifier of the first file and an identifier of the first application to the second electronic device in response to an operation that a user selects the first application, so that the second electronic device opens the first file by using the first application specifically includes: In response to the operation that the user selects the first application, the first electronic device determines whether the first electronic device forms the distributed file system with the second electronic device; when determining that the first electronic device does not form the distributed file system with the second electronic device, the first electronic device establishes the distributed file system with the second electronic device; and the first electronic device sends the identifier of the first file and the identifier of the first application to the second electronic device after determining that the first electronic device forms the distributed file system with the second electronic device, so that the second electronic device opens the first file by using the first application.

In the foregoing embodiment, if an electronic device that receives a shared file does not establish a distributed file system with the first electronic device, the distributed file system may be first established before the file is sent, to improve file sharing efficiency.

With reference to some embodiments of the first aspect, in some embodiments, that the first electronic device sends an identifier of the first file and an identifier of the first application to the second electronic device, so that the second electronic device opens the first file by using the first application specifically includes: The first electronic device creates a mapping file of the first file in a distributed file system, to obtain a first mapping file. Access to the first mapping file points to the first file. The first electronic device sends file access information of the first mapping file and the identifier of the first application to the second electronic device, so that the second electronic device opens the first mapping file based on the file access information of the first mapping file by using the first application.

In the foregoing embodiment, a mapping file of a file may be first created in the distributed file system, and then file access information of the mapping file is sent to the first application on the second electronic device, so that more types of files can be quickly shared with another electronic device in a cross-device manner and opened without a need to completely transmit the entire file, the opened file can be directly modified, and the file can be synchronously modified on the two electronic devices.

With reference to some embodiments of the first aspect, in some embodiments, the identifier of the first application includes an application name of the first application and/or a package name of the first application.

With reference to some embodiments of the first aspect, in some embodiments, after the step in which the first electronic device creates a mapping file of the first file in a distributed file system, to obtain a first mapping file, the method further includes: The first electronic device sets access permission for the first mapping file to allow the first application to access the first mapping file; the first electronic device sets access permission for the first mapping file to allow the second electronic device to access the first mapping file; or the first electronic device sets access permission for the first mapping file to allow the first application on the second electronic device to access the first mapping file.

In the foregoing embodiment, different permission may be set for the mapping file based on a requirement, to improve file sharing security.

With reference to some embodiments of the first aspect, in some embodiments, the method further includes: The first electronic device receives an operation request that is for the first mapping file and that is sent by the second electronic device; the first electronic device operates the first file based on the operation request for the first mapping file, to obtain an operation result; and the first electronic device returns, to the second electronic device, an operation response carrying the operation result.

In the foregoing embodiment, an operation performed on the mapping file may feed back to an operation performed on the first file, to improve file sharing security without affecting normal use of the file.

With reference to some embodiments of the first aspect, in some embodiments, that the first electronic device sends an identifier of the first file and an identifier of the first application to the second electronic device, so that the second electronic device opens the first file by using the first application specifically includes: The first electronic device sends the identifier of the first file and the identifier of the first application to the second electronic device, so that the second electronic device opens the first file by using the first application.

In the foregoing embodiment, the identifier of the first file and the identifier of the first application are directly sent to the second electronic device, and a complete file does not need to be sent, to reduce consumption of network resources.

With reference to some embodiments of the first aspect, in some embodiments, the identifier of the first file is a path of the first file or a file name of the first file, and the identifier of the first application includes an application name of the first application and/or a package name of the first application.

With reference to some embodiments of the first aspect, in some embodiments, that the first electronic device sends an identifier of the first file and an identifier of the first application to the second electronic device, so that the second electronic device opens the first file by using the first application specifically includes: The first electronic device sends the identifier of the first file and the identifier of the first application to the second electronic device, so that the second electronic device accesses the first file by using the first application.

With reference to some embodiments of the first aspect, in some embodiments, before the step in which a first electronic device displays, in response to a first operation, an application associated with a first file in a first device set, the method further includes: The first electronic device receives first application association information sent by the second electronic device. The first application association information includes information that the first application is associated with a first file type, and the first file type is a file type of the first file.

In the foregoing embodiment, the first electronic device may receive a correspondence that is between an installed application and a file type associated with the application and that is sent by another electronic device in a device group.

With reference to some embodiments of the first aspect, in some embodiments, before the step in which a first electronic device displays, in response to a first operation, an application associated with a first file in a first device set, the method further includes: The first electronic device sends second application association information to the second electronic device. The second application association information includes information that a second application is associated with a second file type, and the second application is an application on the first electronic device.

In the foregoing embodiment, the first electronic device may send, to another electronic device, a correspondence between an installed application on the electronic device and a file type associated with the application.

With reference to some embodiments of the first aspect, in some embodiments, the first operation is an operation that the user shares/opens the first file on the first electronic device, and the first device set is an online electronic device in a device group.

With reference to some embodiments of the first aspect, in some embodiments, that a first electronic device displays, in response to a first operation, an application associated with a first file in a first device set, where the application includes a first application on a second electronic device specifically includes: In response to the first operation, the first electronic device determines that the online electronic device in the device group is the first device set; the first electronic device queries application association information, and determines an application associated with the first file in an electronic device in the first device set, where the application association information includes an installed application in the first device set and information about a file type associated with the installed application; and the first electronic device displays the application associated with the first file on the electronic device in the first device set, where the application includes the first application on the second electronic device.

According to a second aspect, this application provides a file sharing method. The method includes: A second electronic device sends a first application association relationship to a first electronic device. The first application association relationship includes information that a first application on the second electronic device is associated with a first file type. The second electronic device receives an identifier of the first application and an identifier of a first file that are sent by the first electronic device. A file type of the first file is the first file type. The second electronic device opens the first file by using the first application.

In the foregoing embodiment, the first electronic device may send the first file associated with the first application to the first application on the second electronic device for opening, and applications supporting a same projection protocol do not need to be installed in two electronic devices that perform cross-device file sharing. More types of files are quickly and conveniently shared with another electronic device in a cross-device manner and are opened by using an associated application.

With reference to some embodiments of the second aspect, in some embodiments, that the second electronic device opens the first file by using the first application specifically includes: The second electronic device accesses the first file by using the first application.

With reference to some embodiments of the second aspect, in some embodiments, that the second electronic device accesses the first file by using the first application specifically includes: The second electronic device reads the first file by using the first application; and the second electronic device writes the first file by using the first application.

With reference to some embodiments of the second aspect, in some embodiments, that the second electronic device receives an identifier of the first application and an identifier of a first file that are sent by the first electronic device specifically includes: The second electronic device receives file access information of a first mapping file and the identifier of the first application that are sent by the first electronic device. The first mapping file is a mapping file that is of the first file and that is created in a distributed file system, and access to the first mapping file points to the first file. That the second electronic device opens the first file by using the first application specifically includes: The second electronic device determines a path of the first mapping file based on the file access information of the first mapping file; and the second electronic device accesses the path of the first mapping file based on the identifier of the first application by using the first application, and reads and displays the first file.

With reference to some embodiments of the second aspect, in some embodiments, the method further includes: When receiving an access request for the first mapping file, the second electronic device determines whether the access request is from the first application; and the second electronic device accesses the first mapping file when determining that the mapping file is from the first application; or the second electronic device rejects the access request when determining that the access request is not from the first application.

In the foregoing embodiment, the second electronic device may authenticate the access request, and the first mapping file can be accessed only when the access request meets a permission requirement.

With reference to some embodiments of the second aspect, in some embodiments, the method further includes: When the second electronic device receives an operation request of the first application for the first mapping file, the second electronic device sends the operation request to the first electronic device; the second electronic device receives an operation response returned by the first electronic device, where the operation response carries an operation result; and the second electronic device returns the operation result to the first application.

With reference to some embodiments of the second aspect, in some embodiments, that the second electronic device receives the first file sent by the first electronic device to the first application specifically includes: The second electronic device receives the identifier of the first file and the identifier of the first application that are sent by the first electronic device. That the second electronic device opens the first file by using the first application specifically includes: The second electronic device determines a path of the first file based on the identifier of the first file; the second electronic device determines the first application based on the identifier of the first application; and the second electronic device accesses the path of the first file by using the first application, and reads and displays the first file.

With reference to some embodiments of the second aspect, in some embodiments, the identifier of the first file is the path of the first file or a file name of the first file; and the identifier of the first application is a package name of the first application and/or an application name of the first application.

According to a third aspect, an embodiment of this application provides a first electronic device. The first electronic device includes one or more processors and a memory. The memory is coupled to the one or more processors, the memory is configured to store computer program code, the computer program code includes computer instructions, and the one or more processors invoke the computer instructions, so that the first electronic device performs the following operations: displaying, in response to a first operation, an application associated with a first file in a first device set, where the application includes a first application on a second electronic device; and sending an identifier of the first file and an identifier of the first application to the second electronic device in response to an operation that a user selects the first application, so that the second electronic device opens the first file by using the first application.

With reference to some embodiments of the third aspect, in some embodiments, the one or more processors are specifically configured to invoke the computer instructions, so that the first electronic device performs the following operations: creating a mapping file of the first file in a distributed file system, to obtain a first mapping file, where access to the first mapping file points to the first file; and sending file access information of the first mapping file and the identifier of the first application to the second electronic device, so that the second electronic device opens the first mapping file based on the file access information of the first mapping file by using the first application.

With reference to some embodiments of the third aspect, in some embodiments, the identifier of the first application includes an application name of the first application and/or a package name of the first application.

With reference to some embodiments of the third aspect, in some embodiments, the one or more processors are further configured to invoke the computer instructions, so that the first electronic device performs the following operations: setting access permission for the first mapping file to allow the first application to access the first mapping file; setting access permission for the first mapping file to allow the second electronic device to access the first mapping file; or setting access permission for the first mapping file to allow the first application on the second electronic device to access the first mapping file.

With reference to some embodiments of the third aspect, in some embodiments, the one or more processors are further configured to invoke the computer instructions, so that the first electronic device performs the following operations: receiving an operation request that is for the first mapping file and that is sent by the second electronic device; operating the first file based on the operation request for the first mapping file, to obtain an operation result; and returning, to the second electronic device, an operation response carrying the operation result.

With reference to some embodiments of the third aspect, in some embodiments, the identifier of the first file is a path of the first file or a file name of the first file.

With reference to some embodiments of the third aspect, in some embodiments, the one or more processors are specifically configured to invoke the computer instructions, so that the first electronic device performs the following operation: sending the identifier of the first file and the identifier of the first application to the second electronic device, so that the second electronic device accesses the first file by using the first application.

With reference to some embodiments of the third aspect, in some embodiments, the one or more processors are further configured to invoke the computer instructions, so that the first electronic device performs the following operation: receiving first application association information sent by the second electronic device, where the first application association information includes information that the first application is associated with a first file type, and the first file type is a file type of the first file.

With reference to some embodiments of the third aspect, in some embodiments, the one or more processors are further configured to invoke the computer instructions, so that the first electronic device performs the following operation: sending second application association information to the second electronic device, where the second application association information includes information that a second application is associated with a second file type, and the second application is an application on the first electronic device.

With reference to some embodiments of the third aspect, in some embodiments, the first operation is an operation that the user shares/opens the first file on the first electronic device, and the first device set is an online electronic device in a device group.

With reference to some embodiments of the third aspect, in some embodiments, the one or more processors are specifically configured to invoke the computer instructions, so that the first electronic device performs the following operations: in response to the first operation, determining that the online electronic device in the device group is the first device set; querying application association information, and determining an application associated with the first file in an electronic device in the first device set, where the application association information includes an installed application in the first device set and information about a file type associated with the installed application; and displaying the application associated with the first file on the electronic device in the first device set, where the application includes the first application on the second electronic device.

With reference to some embodiments of the third aspect, in some embodiments, the one or more processors are further configured to invoke the computer instructions, so that the first electronic device performs the following operation: determining an electronic device that is in the first device set and that forms a distributed file system with the first electronic device. The one or more processors are specifically configured to invoke the computer instructions, so that the first electronic device performs the following operations: displaying the application associated with the first file in the first device set, and preferentially displaying an application on the electronic device that forms the distributed file system with the first electronic device.

With reference to some embodiments of the third aspect, in some embodiments, the one or more processors are specifically configured to invoke the computer instructions, so that the first electronic device performs the following operations: in response to the operation that the user selects the first application, determining whether the first electronic device forms the distributed file system with the second electronic device; when determining that the first electronic device does not form the distributed file system with the second electronic device, establishing the distributed file system with the second electronic device; and sending the first file to the first application on the second electronic device after determining that the first electronic device forms the distributed file system with the second electronic device, so that the second electronic device opens the first file by using the first application.

According to a fourth aspect, an embodiment of this application provides a chip system. The chip system is applied to a first electronic device, the chip system includes one or more processors, and the processor is configured to invoke computer instructions, so that the first electronic device performs the method described in any one of the first aspect and the possible implementations of the first aspect.

According to a fifth aspect, an embodiment of this application provides a computer program product including instructions. When the computer program product runs on a first electronic device, the first electronic device is enabled to perform the method described in any one of the first aspect and the possible implementations of the first aspect.

According to a sixth aspect, an embodiment of this application provides a computer-readable storage medium, including instructions. When the instructions run on a first electronic device, the first electronic device is enabled to perform the method described in any one of the first aspect and the possible implementations of the first aspect.

It can be understood that the electronic device provided in the third aspect, the chip system provided in the fourth aspect, the computer program product provided in the fifth aspect, and the computer storage medium provided in the sixth aspect are all configured to perform the method provided in any one of the first aspect and the possible implementations of the first aspect in embodiments of this application. Therefore, for beneficial effects that can be achieved, refer to beneficial effects in the corresponding method. Details are not described herein.

According to a seventh aspect, an embodiment of this application provides a second electronic device. The second electronic device includes one or more processors and a memory. The memory is coupled to the one or more processors, the memory is configured to store computer program code, the computer program code includes computer instructions, and the one or more processors invoke the computer instructions, so that the second electronic device performs the following operations: sending a first application association relationship to a first electronic device, where the first application association relationship includes information that a first application on the second electronic device is associated with a first file type; receiving an identifier of a first file and an identifier of the first application that are sent by the first electronic device, where a file type of the first file is the first file type; and opening the first file by using the first application.

With reference to some embodiments of the seventh aspect, in some embodiments, the one or more processors are specifically configured to invoke the computer instructions, so that the second electronic device performs the following operation: accessing the first file by using the first application.

With reference to some embodiments of the seventh aspect, in some embodiments, the one or more processors are specifically configured to invoke the computer instructions, so that the second electronic device performs the following operations: reading the first file by using the first application; and writing the first file by using the first application.

With reference to some embodiments of the seventh aspect, in some embodiments, the one or more processors are specifically configured to invoke the computer instructions, so that the second electronic device performs the following operations: receiving file access information of a first mapping file and the identifier of the first application that are sent by the first electronic device, where the first mapping file is a mapping file that is of the first file and that is created in a distributed file system, and access to the first mapping file points to the first file; determining a path of the first mapping file based on the file access information of the first mapping file; and accessing the path of the first mapping file based on the identifier of the first application by using the first application, and reading and displaying the first file.

With reference to some embodiments of the seventh aspect, in some embodiments, the one or more processors are further configured to invoke the computer instructions, so that the second electronic device performs the following operations: when receiving an access request for the first mapping file, the second electronic device determines whether the access request is from the first application; and the second electronic device accesses the first mapping file when determining that the mapping file is from the first application; or the second electronic device rejects the access request when determining that the access request is not from the first application.

With reference to some embodiments of the seventh aspect, in some embodiments, the one or more processors are further configured to invoke the computer instructions, so that the second electronic device performs the following operations: when receiving an operation request of the first application for the first mapping file, sending the operation request to the first electronic device; receiving an operation response returned by the first electronic device, where the operation response carries an operation result; and returning the operation result to the first application.

With reference to some embodiments of the seventh aspect, in some embodiments, the one or more processors are specifically configured to invoke the computer instructions, so that the second electronic device performs the following operations: determining a path of the first file based on the identifier of the first file; determining the first application based on the identifier of the first application; and accessing the path of the first file by using the first application, and reading and displaying the first file.

With reference to some embodiments of the seventh aspect, in some embodiments, the identifier of the first application includes an application name of the first application and/or a package name of the first application.

According to an eighth aspect, an embodiment of this application provides a chip system. The chip system is applied to a second electronic device, the chip system includes one or more processors, and the processor is configured to invoke computer instructions, so that the second electronic device performs the method described in any one of the second aspect and the possible implementations of the second aspect.

According to a ninth aspect, an embodiment of this application provides a computer program product including instructions. When the computer program product runs on a second electronic device, the second electronic device is enabled to perform the method described in any one of the first aspect and the possible implementations of the first aspect.

According to a tenth aspect, an embodiment of this application provides a computer-readable storage medium, including instructions. When the instructions run on a second electronic device, the second electronic device is enabled to perform the method described in any one of the first aspect and the possible implementations of the first aspect.

It can be understood that the electronic device provided in the seventh aspect, the chip system provided in the eighth aspect, the computer program product provided in the ninth aspect, and the computer storage medium provided in the tenth aspect are all configured to perform the method provided in any one of the second aspect and the possible implementations of the second aspect in embodiments of this application. Therefore, for beneficial effects that can be achieved, refer to beneficial effects in the corresponding method. Details are not described herein.

DESCRIPTION OF EMBODIMENTS

Figure 1:
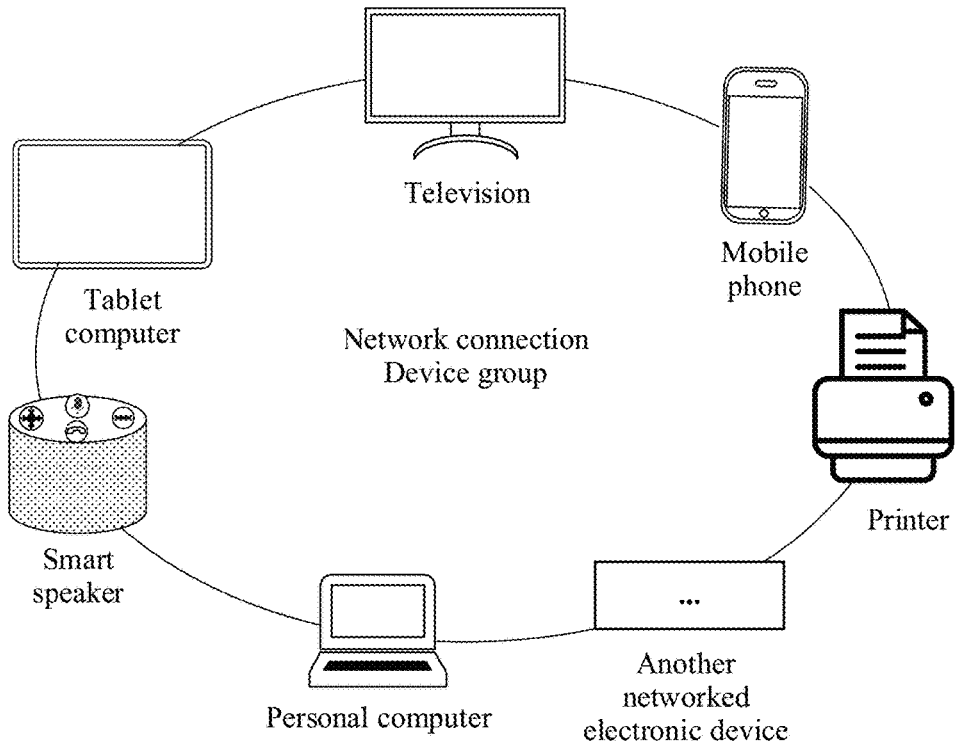
FIG. 1 is a schematic diagram of an example scenario in which a device group is formed according to an embodiment of this application.

Terms used in embodiments of this application are merely intended to describe specific embodiments, but are not intended to limit this application. The singular expressions "one", "one type of", "the", "the foregoing", "that", and "this" used in this specification and the appended claims of this application are also intended to include plural expressions, unless otherwise specified in the context clearly. It should also be understood that, the term "and/or" used in this application indicates and includes any one or all of possible combinations of one or more listed items.

The terms such as "first", "second", and "third" mentioned below are merely intended for a purpose of description, and shall not be understood as an indication or implication of relative importance or implicit indication of a quantity of indicated technical features. Therefore, a feature limited by "first", "second", "third", or the like may explicitly or implicitly include one or more features. In the descriptions of embodiments of this application, unless otherwise specified, "a plurality of" means two or more.

For ease of understanding, the following first describes related terms and concepts in embodiments of this application.

(1) Installed Application on an Electronic Device and a File Type Associated with the Application:

1.1. Application:

The application (application, APP) is a computer program or software that is developed and runs in an operating system of an electronic device to implement one or more specific functions.

After an application is installed in the electronic device, a function of the application may be implemented by running the application. For example, the electronic device may implement a web page browsing function by installing a browser application, and may implement a video playing function by installing a video playing application.

1.2. File Type Associated with an Application and a File Associated with the Application:

Each application has a file type associated with the application, and the file type may be briefly referred to as a file type associated with the application.

For example, if a video playing application supports to play only a file in an mp4 format or an rmvb format, a file type associated with the video playing application is the mp4 format or the rmvb format; and if a video playing application may support to play a file in an avi format, an mp4 format, an rmvb format, or a wmv format, a file type associated with the video playing application is the avi format, the mp4 format, the rmvb format, or the wmv format.

For another example, if a document application supports to open and edit only a file in a txt format, a file type associated with the document application is the txt format; and if a document application supports to open and edit a file in a doc format or a pdf format, a file type associated with the document application is the doc format or the pdf format.

It can be understood that, if a file type of a first file is associated with a first application, it may be referred to as that the first file is associated with the first application.

It can be understood that, that the first application is associated with the first file may be specifically represented in a plurality of different forms.

Optionally, a form may be as follows: The first application may support opening of the first file by default. For example, if the first file is a video, the first application may play the video; and if the first file is a document, the first application may display the document.

Optionally, another form may be as follows: The first application may edit the first file. For example, if the first file is a document, the first application may not only display the document, but also support to modify and save the document.

There may also be many other representation forms in which the first application is associated with the first file. This is not limited herein.

With reference to FIG. 21 to FIG. 25, the following provides example descriptions of representation forms in which the first file is associated with or is not associated with the first application.

If the first file is a document file in the doc format, the first application is a video playing application. When the first file is opened by using the first application, because the first application cannot support opening of the first file by default, a user interface 210 shown in FIG. 21 may be displayed on an electronic device. A prompt box 211 may be displayed in the user interface 210. The prompt box 211 may display "The player does not support a file in the format". Because the first application cannot open or use the first file, in this case, it indicates that the first application is not associated with the first file.

If the first file is a document file in the doc format, the first application is a document reader, but the first application supports opening of only a document in the txt format by default. If the first file is opened by using the first application, a plurality of cases may occur:

A case may be as follows: A user interface 220 shown in FIG. 22 may be displayed on the electronic device. A prompt box 221 may be displayed in the user interface 220. The prompt box 211 may display "The reader does not support a file in the format". Because the first application cannot open or use the first file, in this case, it indicates a representation form in which the first application is not associated with the first file.

A case may be as follows: A user interface 230 shown in FIG. 23 may be displayed on the electronic device. Partial content of the first file may be displayed in the user interface 230, but partial content is still displayed as garbled characters. Content of the first file cannot be normally viewed. Therefore, in this case, it also indicates a representation form in which the first application is not associated with the first file.

A case may be as follows: A user interface 240 shown in FIG. 24 may be displayed on the electronic device. All content of the first file may be normally displayed in the user interface 240. However, the first file cannot be edited by using an editing function provided by the first application. A user cannot tap an editing control 241 in the user interface 240. In this case, based on different preconfigurations, in some embodiments, the first application is associated with the first file; and in some embodiments, the first application is not associated with the first file. This is not limited herein.

If the first file is a file in the mp4 format, the first application is a video playing application, and the first application supports opening of the file in the mp4 format by default. When the first file is opened by using the first application, a user interface 250 shown in FIG. 25 may be displayed on the electronic device. The first application may normally use the first file. In this case, it indicates a representation form in which the first application is associated with the first file.

1.3. Correspondence Between an Installed Application and a File Type Associated with the Application:

The electronic device may store the correspondence between an installed application and a file type associated with the application.

The installed application may be represented by using an identifier of the application, and the file type associated with the application may be represented by using a file name extension or a file name extension. The identifier of the application may be one of an application name and a package name of the application, a combination thereof, or the like. This is not limited herein.

For example, Table 1 shows an example of the correspondence between an installed application and a file type associated with the application.

TABLE 1

| Installed application | File type associated with the application |
|---|---|
| Application 1 | mp4 and rmvb |
| Application 2 | avi, mp4, rmvb, and wmv |
| Application 3 | text |
| Application 4 | doc and pdf |
| . . . | . . . |

It can be understood that Table 1 shows merely the example of the correspondence between an installed application and a file type associated with the application. In an actual application, the correspondence may be stored in another different form, for example, an array, a matrix, or a database. This is not limited herein.

1.4. Correspondence Among an Electronic Device, an Installed Application, and a File Type Associated with the Application:

In embodiments of this application, the electronic device may not only store a correspondence between an installed application on the electronic device and a file type associated with the application, but also store a correspondence between an installed application on another electronic device in a device group and a file type associated with the application. Therefore, the electronic device may store the correspondence among an electronic device, an installed application, and a file type associated with the application. To simplify description, in some embodiments, the correspondence may be briefly referred to as a device-application-file type correspondence.

In some embodiments, the device-application-file type correspondence may not be stored in the electronic device, but is stored in a network server. The electronic device may query the device-application-file type correspondence from the network server in real time based on a requirement. This is not limited herein.

The electronic device may be represented by using an identifier of the electronic device. The identifier of the electronic device may be one of a device name, MAC, and an IMEI, a combination thereof, or the like. This is not limited herein.

For example, Table 2 shows an example of the correspondence among an electronic device, an installed application, and a file type associated with the application.

TABLE 2

| Electronic device | Installed application | File type associated with the application |
|---|---|---|
| Electronic device A | Application 1 | mp4 and rmvb |
|  | Application 2 | text, doc, and pdf |
|  | Application 3 | mp3 |
| Electronic device B | Application 4 | avi, mp4, rmvb, and wmv |
|  | Application 5 | doc and pdf |
|  | Application 6 | mp3 and flac |
| Electronic device C | Application 7 | text |
|  | Application 8 | mp3 |

It can be understood that Table 2 shows merely the example of the correspondence among an electronic device, an installed application, and a file type associated with the application. In an actual application, the correspondence may be stored in another different form, for example, an array, a matrix, or a database. This is not limited herein. The correspondence among an electronic device, an installed application, and a file type associated with the application may be separately stored in different files, or may be all stored in one file. This is not limited herein.

(2) Device Group:

2.1. Composition of a Device Group:

In embodiments of this application, a plurality of electronic devices form a device group through a network connection. The electronic device in the device group may perform a file sharing method in embodiments of this application.

In embodiments of this application, the device group may be formed in a plurality of manners.

In some embodiments, it may be specified that a plurality of electronic devices that log in to a same network account form the device group.

In some embodiments, it may be specified that a plurality of electronic devices in a same local area network form the device group.

In some embodiments, it may be specified that a plurality of electronic devices with a same specific identifier form the device group.

In some embodiments, the foregoing manners of forming the device group may be further combined to obtain the device group.

It can be understood that there may be another manner of forming the device group. This is not limited herein.

To help describe the file sharing method in embodiments of this application, in the following embodiments of this application, descriptions are provided by using an example in which the plurality of electronic devices that log in to a same network account form the device group. It can be understood that such an example description does not limit a case in which the device group in embodiments of this application can be formed only in this manner.

For example, FIG. 1 is a schematic diagram of an example scenario in which a device group is formed according to an embodiment of this application. As shown in FIG. 1, the device group may include networked electronic devices such as a mobile phone, a television, a tablet computer, a smart speaker, a personal computer, and a printer. This is not limited herein.

2.2. Trusted Authentication:

Optionally, in some embodiments, the plurality of electronic devices in the device group may form a trusted communication network. The trusted communication network may meet the following requirements:

1. The plurality of electronic devices authenticate each other.

Authentication may be performed in a plurality of possible manners. For example, a trusted authentication certificate, account, device number, or the like is preset. This is not limited herein.

2. After authentication is completed, a communication session link may be established when the plurality of electronic devices communicate with each other, so that session security can be ensured.

2.3. Device List:

In embodiments of this application, each electronic device in the device group may store a device list, and the device list may include identifiers of all the electronic devices in the device group.

In some embodiments, the electronic device may store a separate device list file. In some embodiments, there may be no separate device list file on the electronic device, and a field corresponding to an electronic device in the stored correspondence among an electronic device, an installed application, and a file type associated with the application may be used as the device list.

This is not limited herein.

(3) Online Status of an Electronic Device in a Device Group:

3.1. Define the Online Status:

In embodiments of this application, the online status of the electronic device in the device group may include two states: an online state and an offline state.

When an electronic device accesses the device group through a network connection and can communicate with another electronic device, the electronic device is online. When an electronic device exits the device group or is disconnected from the network connection, the electronic device is offline.

3.2. Determine the Online Status:

In embodiments of this application, an electronic device in the device group may determine an online status of another electronic device in the device group in a plurality of manners.

For example, when accessing the device group through a network connection, an electronic device Ain the device group may send an online notification to another electronic device in the device group. After receiving the online notification, the another electronic device may determine that an online status of the electronic device A is an online state. When going offline, the electronic device A may send an offline notification to the another electronic device in the device group. After receiving the offline notification, the another electronic device may determine that the online status of the electronic device A is an offline state.

For example, each electronic device in the device group may periodically send a heartbeat detection signal to all other devices accessing the device group, and determine whether a response of another electronic device to the heartbeat detection signal is received, to determine an online status of the another electronic device. When an electronic device A can receive a response of an electronic device B to the heartbeat detection signal, the electronic device A may determine that an online status of the electronic device B is an online state; and when the electronic device A does not receive the response of the electronic device B to the heartbeat detection signal within a period of time, the electronic device A may determine that the online status of the electronic device B is an offline state.

For example, each electronic device in the device group may determine a status of a communication link to another electronic device accessing the device group, to determine an online status of the another electronic device. When an electronic device A successfully establishes a communication link to an electronic device B, the electronic device A may determine that an online status of the electronic device B is an online state; and when the electronic device A determines that the communication link to the electronic device B is disconnected, the electronic device A may determine that the online status of the electronic device B is an offline state.

It can be understood that the electronic device may determine the online status of the another electronic device in the device group in any one or a combination of the foregoing manners, or may determine the online status of the another electronic device in the device group in a plurality of other different manners. This is not limited herein.

3.3. Store the Online Status:

In embodiments of this application, each electronic device in the device group may store a correspondence between another electronic device and an online status of the another electronic device. To simplify description, in some embodiments, the correspondence may be briefly referred to as an online status correspondence.

For example, Table 3 shows an example of the stored correspondence between another electronic device in the device group and an online status of the another electronic device.

TABLE 3

| Electronic device | Online status |
| --- | --- |
| Electronic device B | Online |
| Electronic device C | Online |
| Electronic device D | Offline |

It can be understood that Table 3 shows merely the example of the correspondence between another electronic device in the device group and an online status of the another electronic device. In an actual application, the correspondence may be stored in another different form, for example, an array, a matrix, or a database. This is not limited herein.

In some embodiments, the online status correspondence may be separately stored. In some embodiments, the electronic device may not separately store the online status correspondence; and may add an online status field to the device-application-file type correspondence, and store a correspondence among an electronic device, an online status, an installed application, and a file type associated with the application to reflect both the device-application-file type correspondence and the online status correspondence. This is not limited herein.

In some embodiments of this application, an online electronic device in the device group may also be referred to as a first device set. This is not limited herein.

(4) Distributed File System:

In some embodiments of this application, the electronic devices in the device group may form a distributed file system.

The distributed file system provides a logical file system structure for a resource distributed at any location in each electronic device, so that a shared file distributed on each electronic device is accessed more conveniently.

The distributed file system usually includes two parts: file metadata and file content. The file metadata records location information of the file content (which usually includes a device ID and a location of the file content in a storage system of the device, where a same file may be fragmented and stored in a plurality of devices). The file content is a storage block or file that stores actual content of the file. The file metadata is visible and accessible on each electronic device. When an electronic device needs to access a distributed file, the electronic device first obtains location information of the file based on the file metadata; and initiates a file content access request to a device specified in the location information of the file. After receiving the file access request, a corresponding device obtains corresponding file content from a local storage system, and returns the file content.

(5) Mapping File of a File:

In some embodiments of this application, the electronic device may create a distributed mapping file for a file in a local file system. The mapping file may be a symlink file that points to a real file. All access to the mapping file may be transferred to a real file to which the mapping file points. In this manner, a file in the local file system does not need to be copied into the distributed file system, and another electronic device may access the file by using a mapping file. In addition, access permission may be further set for the mapping file, to implement access control of the another electronic device over the file.

A distributed mapping file is usually created by using a symlink command or function of the file system, and a symlink file pointing to a file in the local file system on the electronic device is created in the distributed file system. In this way, metadata of the symlink file records an ID of the electronic device and a file path in the local file system, and then, the another electronic device performs access in a manner described in (4).

Figure 2:
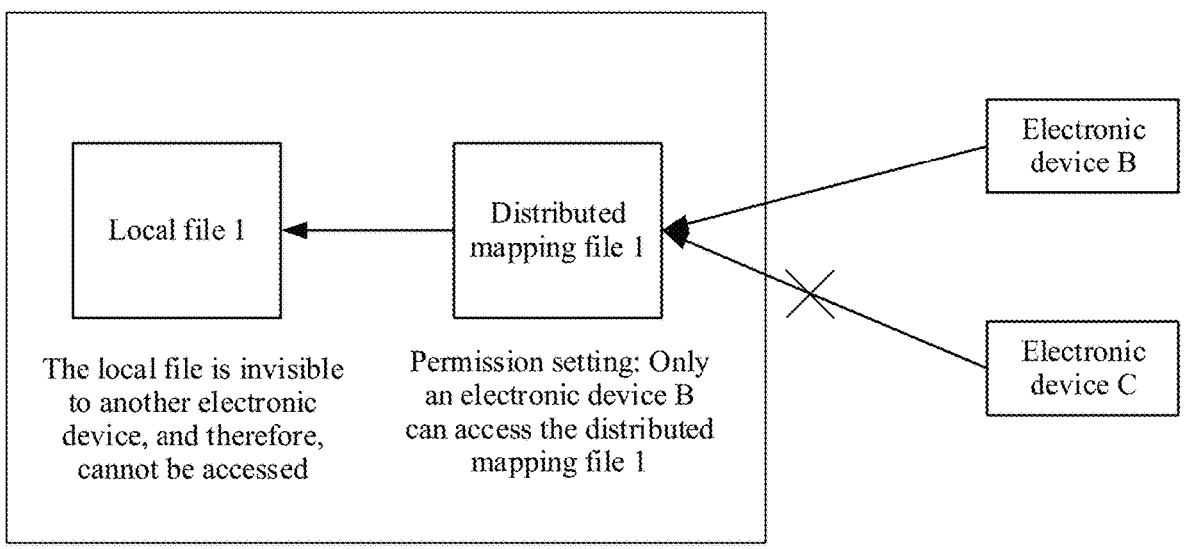
FIG. 2 is an example schematic diagram of performing access permission control by using a mapping file according to an embodiment of this application.

For example, FIG. 2 is an example schematic diagram of performing access permission control by using a mapping file according to an embodiment of this application. After an electronic device A creates a distributed mapping file 1 for a local file 1, another electronic device may access the distributed mapping file 1. All access and modifications to the distributed mapping file 1 may point to the local file 1. Access permission is set for the distributed mapping file 1. For example, after it is specified that only an electronic device B can access the mapping file 1, the electronic device B can access and modify the local file 1 without directly accessing the local file 1. In addition, because the local file 1 is invisible to another electronic device, another device cannot directly access the local file 1, to ensure security of the local file on the electronic device A.

It can be understood that the access permission may be set for the distributed mapping file in a plurality of different manners. For example, it may be specified that an electronic device with a specific device identifier can access the distributed mapping file; or it may be specified that an application with a specific application identifier can access the distributed mapping file; or it may be specified that only an application with a specific application identifier in an electronic device with a specific device identifier can access the distributed mapping file. This is not limited herein.

Figure 3:
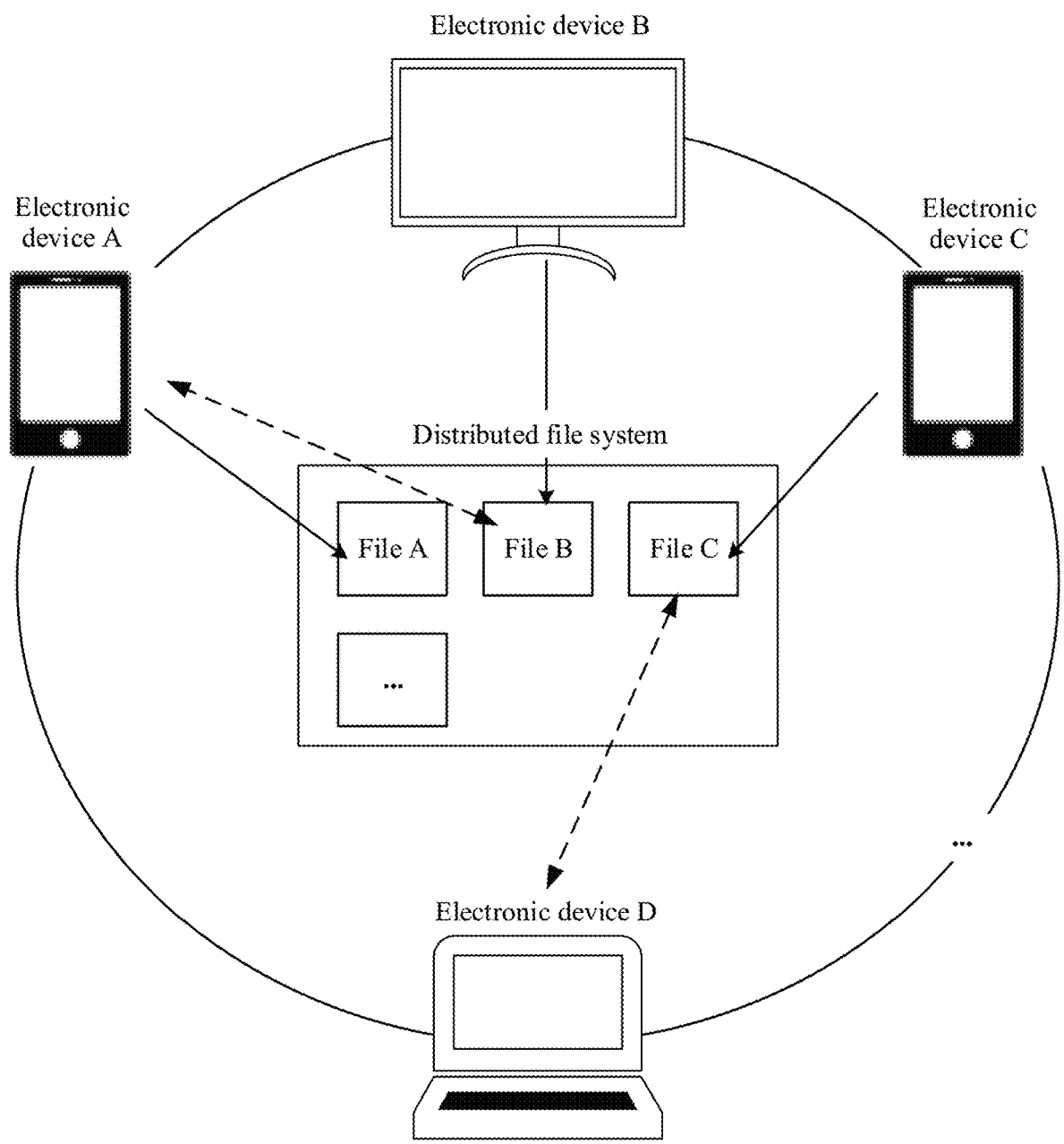
FIG. 3 is an example schematic diagram in which a plurality of electronic devices form a distributed file system according to an embodiment of this application.

For example, FIG. 3 is an example schematic diagram in which a plurality of electronic devices form a distributed file system according to an embodiment of this application. For example, a file A is a file in an electronic device A, a file B is a file in an electronic device B, and a file C is a file in an electronic device C. After the electronic device A, the electronic device B, the electronic device C, and an electronic device D form a distributed file system, any electronic device can conveniently access a file in another electronic device in the distributed file system.

Figure 4:
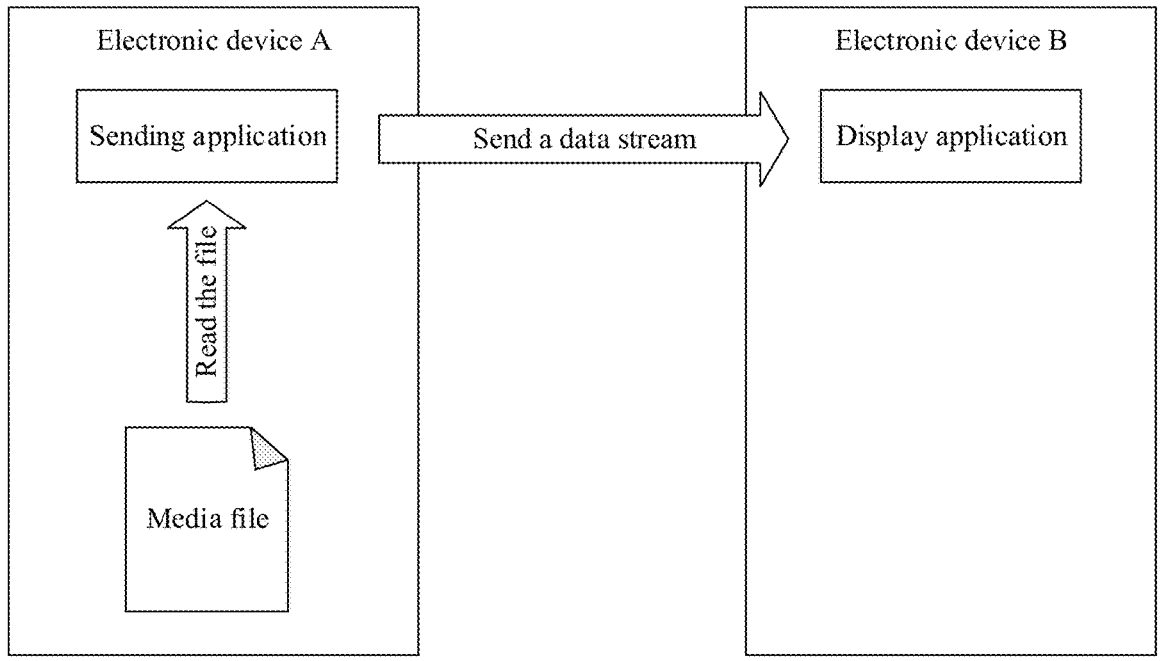
FIG. 4 is a schematic diagram of implementing cross-device file sharing.

FIG. 4 is a schematic diagram of implementing cross-device file sharing. When a user wants to display a file in an electronic device A on an electronic device B, the user may cast a media file by using a projection sending application. The electronic device A sends a data stream of the media file to display applications in the electronic device B that support a same projection protocol (for example, DLNA or Miracast), to display the data stream.

However, when cross-device file sharing is performed in this manner, a file type of a file that can be shared is related to a projection protocol, and a supported file type is not comprehensive enough. Even if a file can be displayed in the electronic device B, the electronic device B is not supported to directly modify the file. In addition, applications supporting a same projection protocol need to be installed in two electronic devices that perform cross-device file sharing, and the applications supporting a same projection protocol need to be used to share a file and open and display the file. Therefore, integration difficulty is high.

Figure 5:
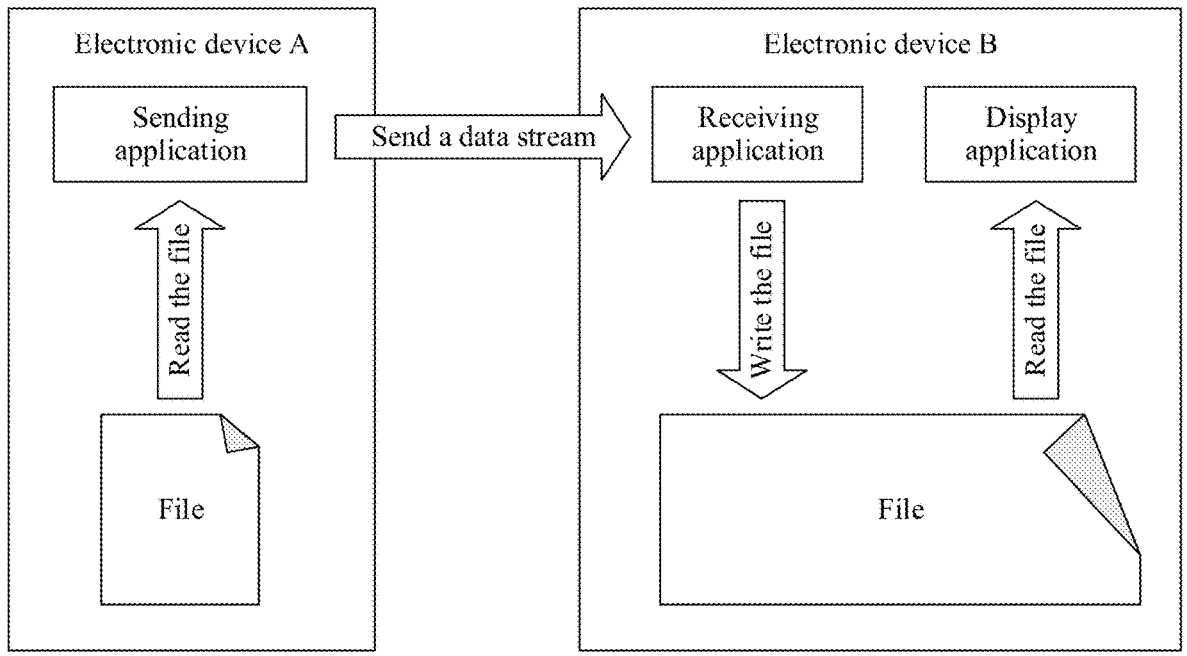
FIG. 5 is another schematic diagram of implementing cross-device file sharing according to an embodiment of this application.

FIG. 5 is another schematic diagram of implementing cross-device file sharing. When an electronic device A needs to share a file with an electronic device B, the electronic device A needs to first send the file to the electronic device B by using a sending application. After completing receiving of the file by using a receiving application, the electronic device B may display the file by using a display application.

However, when cross-device file sharing is performed in this manner, a user needs to first transmit a file, and after transmission is completed, select a corresponding application to open the file. An operation process is complex and time-consuming. For example, for a large file such as a video, only after transmission is completed by consuming a large amount of time, an application that can be used to open the file can be selected in the electronic device B to open the file. In addition, after the electronic device B receives the file, the file is no longer associated with the file on the electronic device A. After the file on the electronic device B is modified, the file on the electronic device A is not modified correspondingly. This manner is not applicable to a collaborative editing scenario.

An embodiment of this application provides a file sharing method. An electronic device A obtains a correspondence between an installed application on another electronic device and a file type associated with the application, and may directly select, on the electronic device A, an associated application on another online electronic device to open a to-be-opened file. According to the file sharing method in this embodiment of this application, an entire file does not need to be completely transmitted. To be specific, more types of files can be quickly shared with another electronic device in a cross-device manner and opened, an opened file can be directly modified, and the file can be synchronously modified on the two electronic devices. In addition, applications supporting a same projection protocol do not need to be installed in two electronic devices that perform cross-device file sharing. More types of files are quickly and conveniently shared with another electronic device in a cross-device manner and are opened.

For example, FIG. 6(a), FIG. 6(b), FIG. 6(c), and FIG. 6(d) and FIG. 7(a), FIG. 7(b), and FIG. 7(c) each are a schematic diagram of a group of example scenarios of a file sharing method according to an embodiment of this application.

With reference to a device group shown in FIG. 1, it is assumed that a mobile phone, a television, and a tablet computer in the device group are online currently.

Figure 6A:
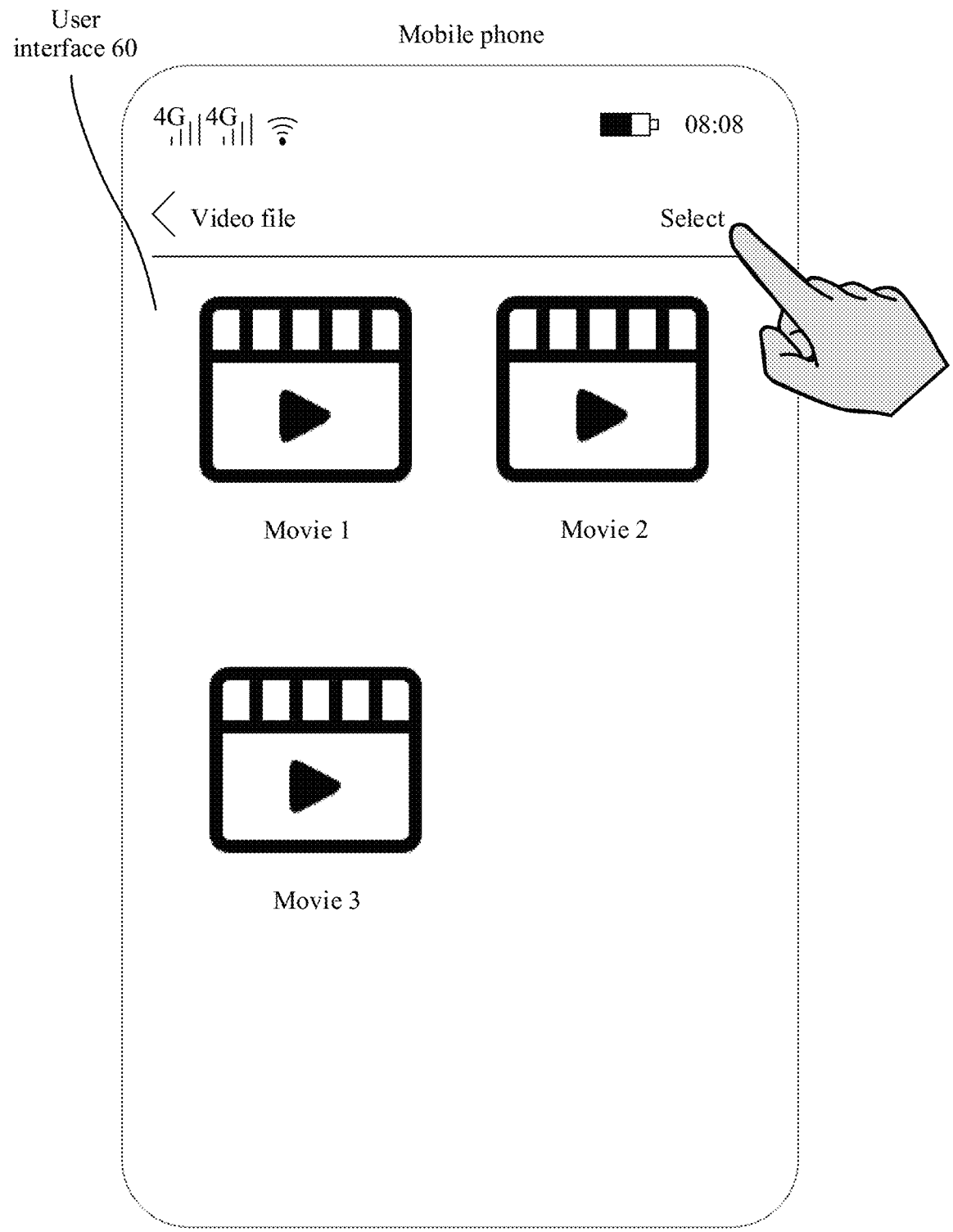
FIG. 6(a), FIG. 6(b), FIG. 6(c), and FIG. 6(d) and FIG. 7(a), FIG. 7(b), and FIG. 7(c) each are a schematic diagram of a group of example scenarios of a file sharing method according to an embodiment of this application.
Figure 6B:
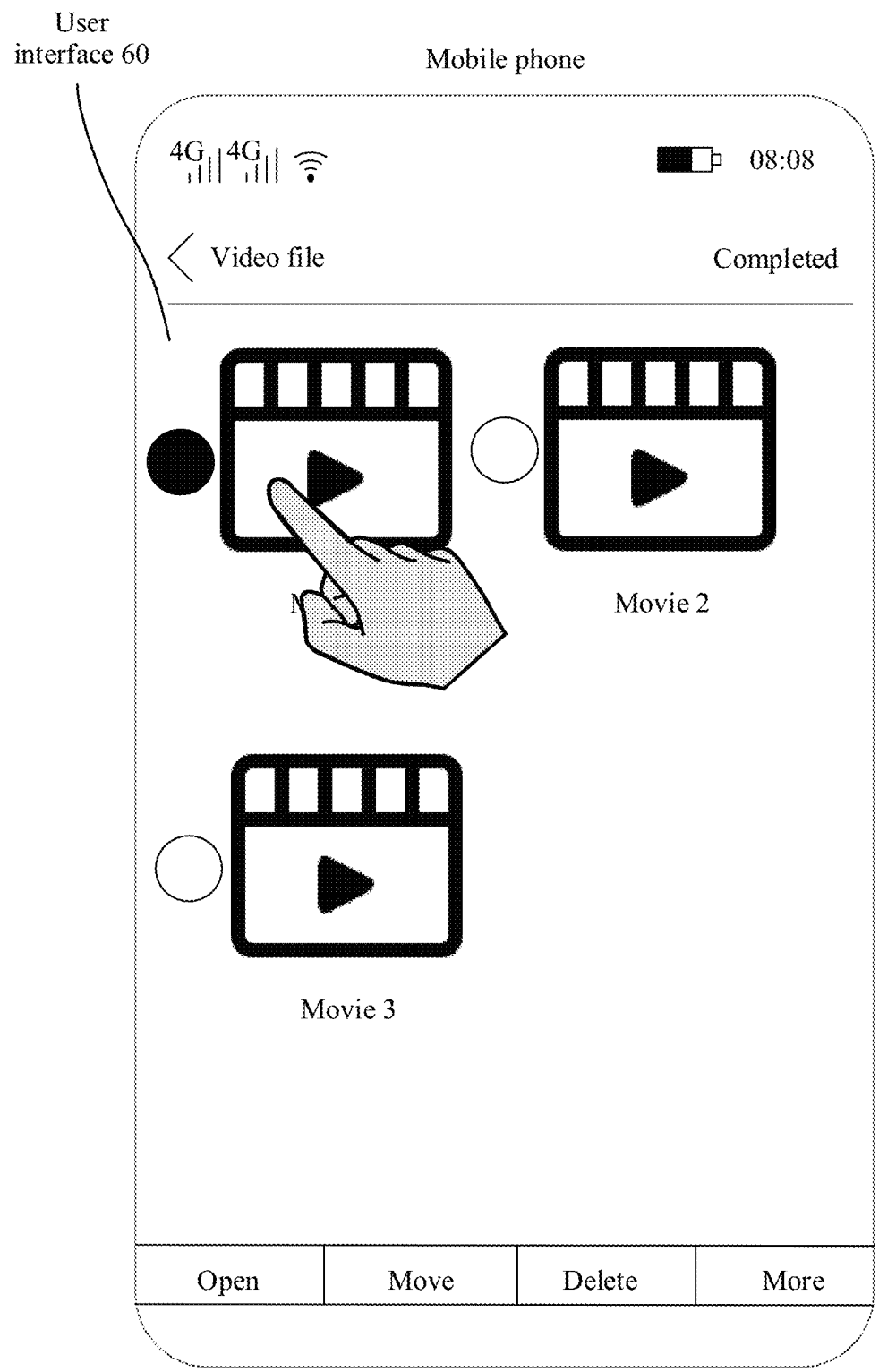
Figure 6C:
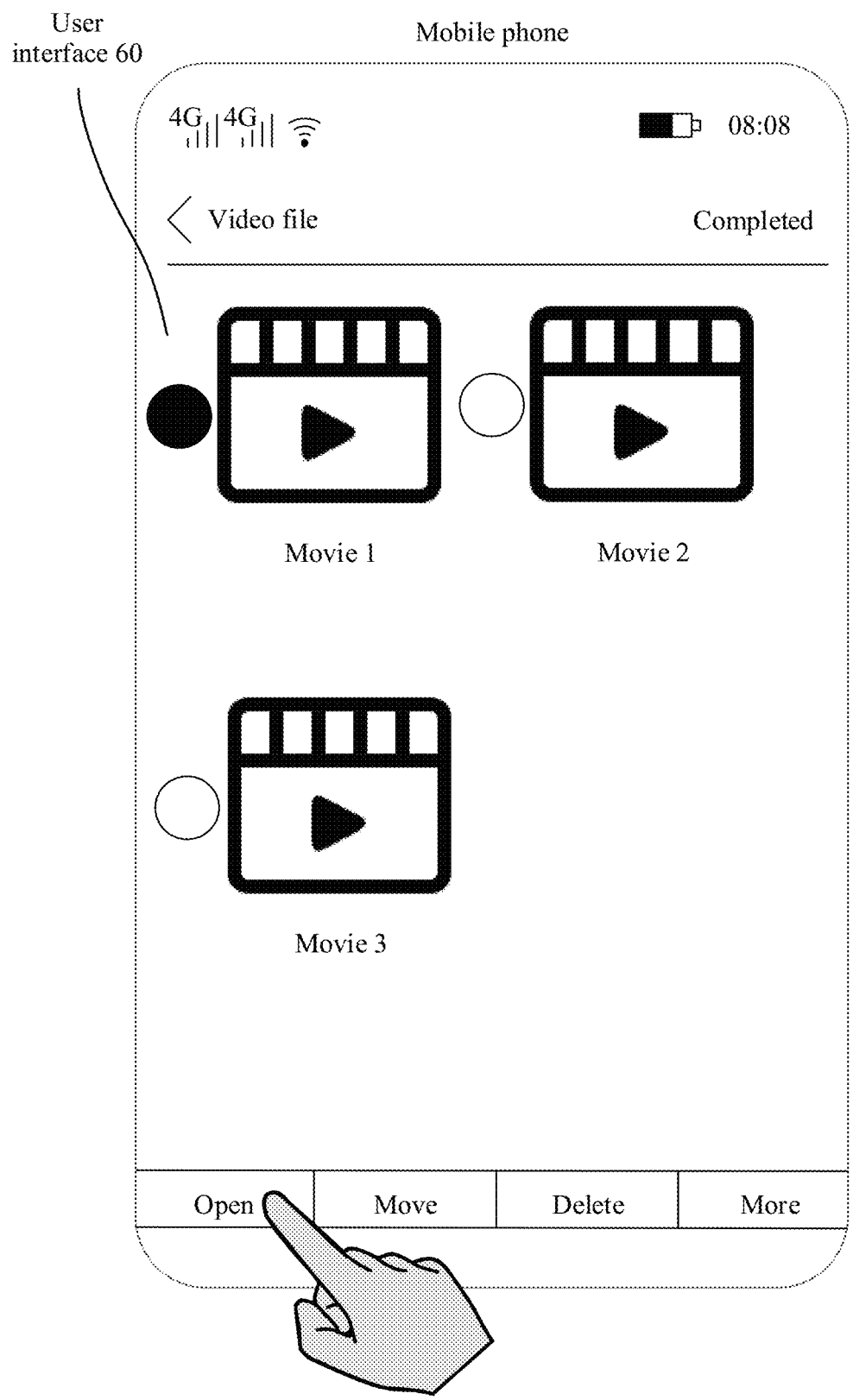
Figure 6D:
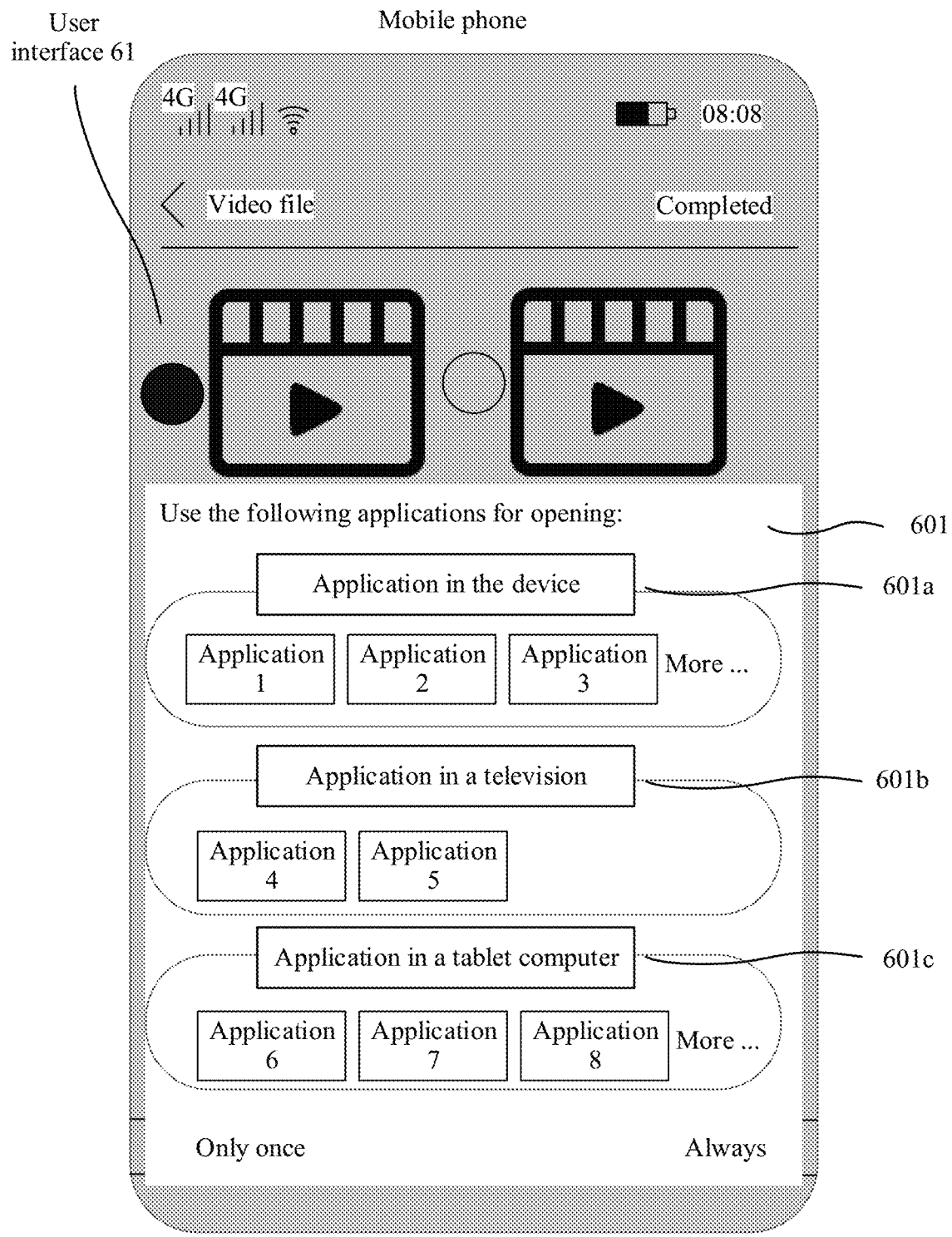

As shown in FIG. 6(a) to FIG. 6(c), in response to an operation that a user chooses to open a file "Movie 1" in a user interface 60 of the mobile phone, an electronic device A may display a user interface 61 shown in FIG. 6(d). The user interface 60 may be a video file display interface of the mobile phone, and displays video files stored on the mobile phone: Movie 1, Movie 2, and Movie 3.

In the user interface 61 shown in FIG. 6(d), a control 601 for selecting an application for opening may be displayed. The control 601 for selecting an application for opening may display an electronic device that supports opening of the file "Movie 1" on an online electronic device in the device group, and an application associated with the file "Movie 1" on the electronic device, so that the user performs selection. For example, the control 601 for selecting an application for opening may include a display area 601a of an application on the device, a display area 601b of an application in a television, and a display area 601c of an application on a tablet computer.

An application 1, an application 2, and an application 3 on the mobile phone that are associated with the file "Movie 1" may be displayed in the display area 601a of an application on the device.

An application 4 and an application 5 in the television that are associated with the file "Movie 1" may be displayed in the display area 601b of an application in a television.

An application 6, an application 7, and an application 8 in the tablet computer that are associated with the file "Movie 1" may be displayed in the display area 601c of an application on a tablet computer.

Figure 7A:
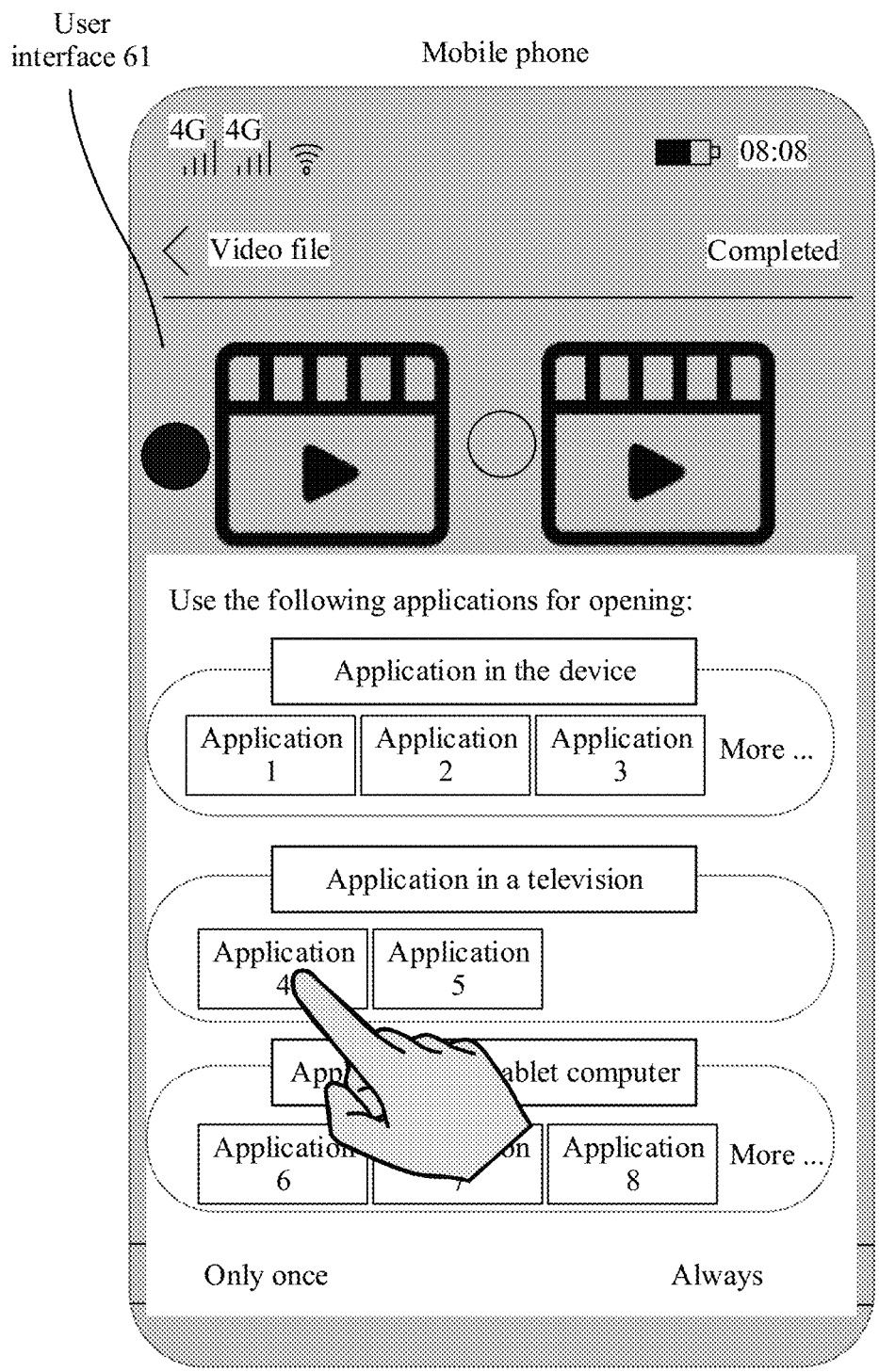
Figure 7B:
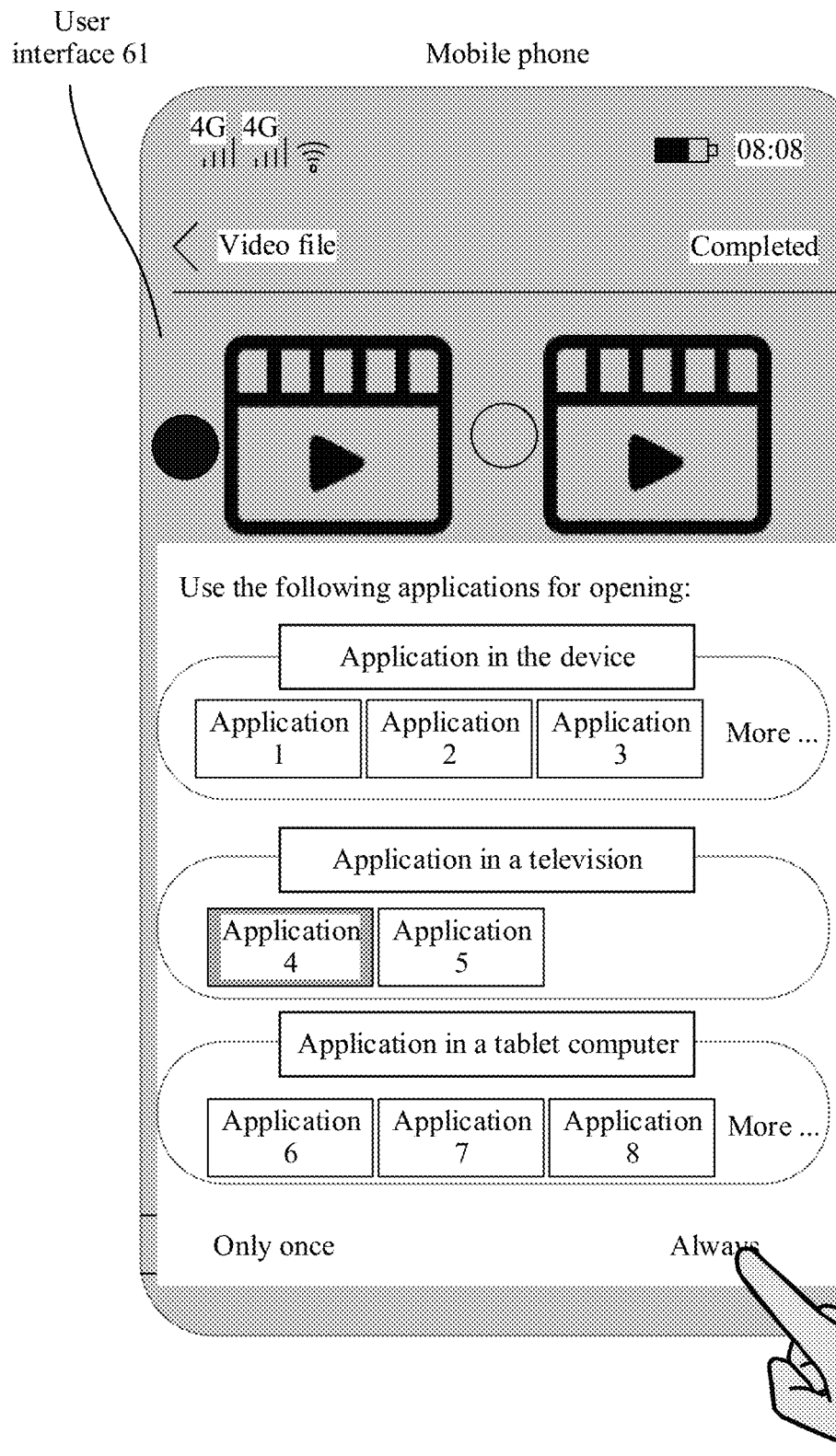
Figure 7C:
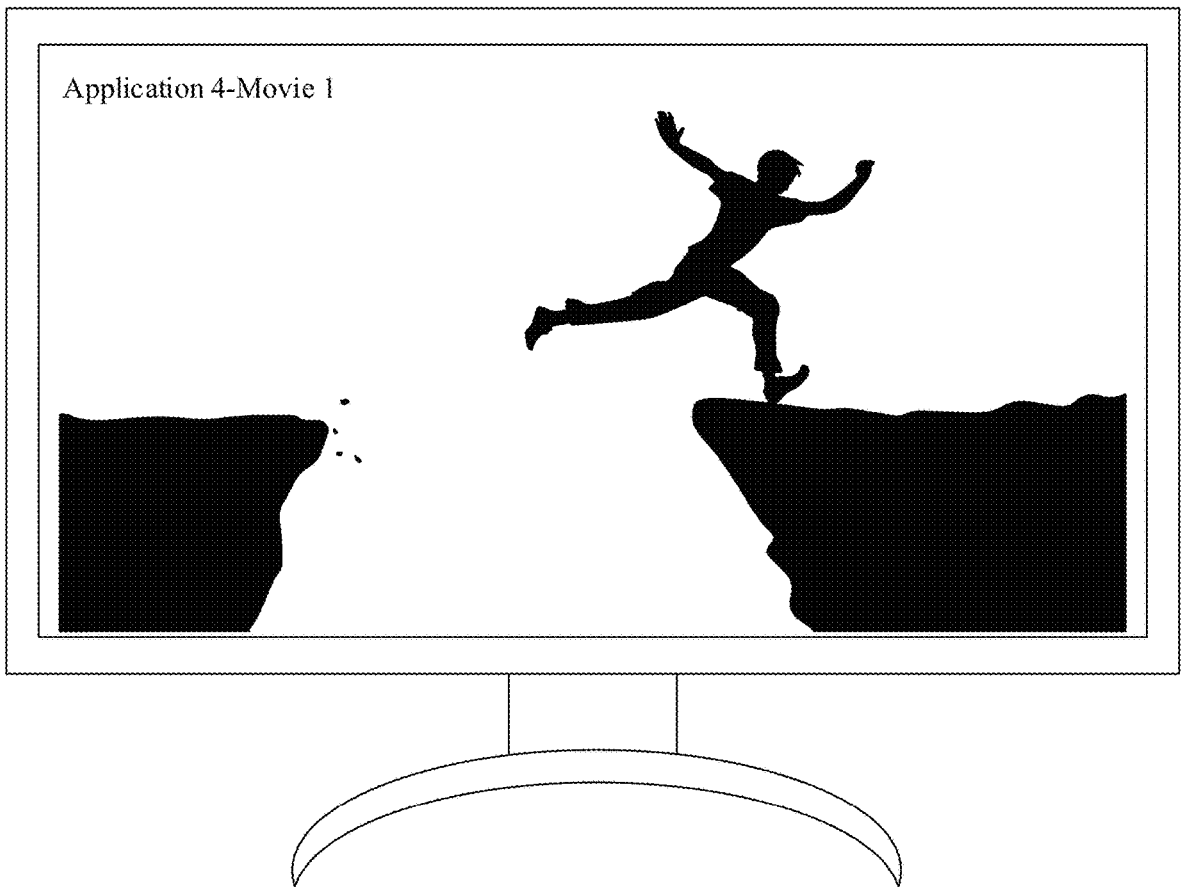

As shown in FIG. 7(a) and FIG. 7(b), in response to an operation, in the user interface 61 of the mobile phone, that the user chooses to open the file "Movie 1" by always using the application 4 in the television (for example, an operation of tapping the application 4 in the display area 601b of an application in a television and then tapping a control "Always"), as shown in FIG. 7(c), the file "Movie 1" may be played on the television in the device group by using the application 4 selected by the user.

It can be learned that, in the file sharing method in this embodiment of this application, more types of files can be quickly and conveniently shared, in a cross-device manner, with an application associated with the files on another electronic device and are opened.

It can be understood that FIG. 6(a), FIG. 6(b), FIG. 6(c), and FIG. 6(d) and FIG. 7(a), FIG. 7(b), and FIG. 7(c) each are merely an example scenario of the file sharing method in this embodiment of this application. The file sharing method in this embodiment of this application may be further applied to many other scenarios. For example, after receiving a document by using the mobile phone, the user may directly choose to print the document by using a printer. For example, after taking a photo by using the mobile phone, the user may directly open and edit the photo by using the tablet computer. For another example, after editing a document by using the tablet computer, the user may directly send the document to another person by using a social application on the mobile phone. This is not limited herein.

The following first describes an example electronic device 100 provided in an embodiment of this application.

Figure 8:
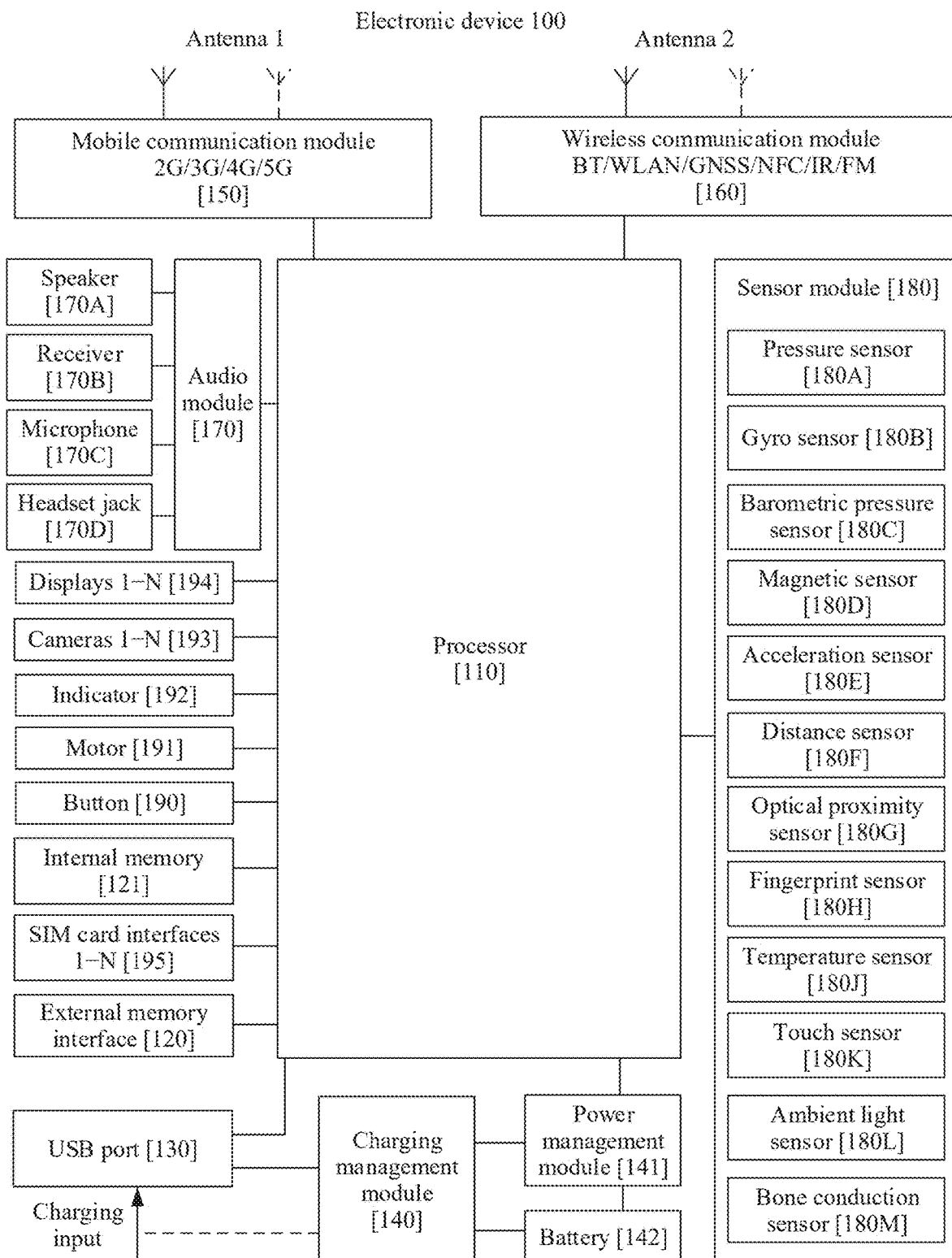
FIG. 8 is a schematic diagram of a structure of an electronic device 100 according to an embodiment of this application.

FIG. 8 is a schematic diagram of a structure of an electronic device 100 according to an embodiment of this application.

The following specifically describes this embodiment by using the electronic device 100 as an example. It should be understood that the electronic device 100 may include more or fewer components than those shown in the figure, may combine two or more components, or may have different component configurations. The various components shown in the figure may be implemented in hardware, software, or a combination of hardware and software including one or more signal processing and/or application-specific integrated circuits.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on instruction operation code and a time sequence signal, and complete control of instruction fetching and instruction execution.

A memory may be further disposed in the processor 110, and is configured to store instructions and data. In some embodiments, the memory in the processor 110 is a cache. The memory may store instructions or data that is just used or is cyclically used by the processor 110. If the processor 110 needs to use the instructions or the data again, the processor 110 may directly invoke the instructions or the data from the memory. In this case, repeated access is avoided, a waiting time period of the processor 110 is reduced, and efficiency of a system is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general purpose input/output (general-purpose input/output, GPIO) interface, a subscriber identification module (subscriber identity module, SIM) interface, a universal serial bus (universal serial bus, USB) port, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used for audio communication, to sample, quantize, and encode an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement the function of answering a call through the Bluetooth headset. Both the I2S interface and the PCM interface may be used for audio communication.

The UART interface is a universal serial data bus, and is used for asynchronous communication. The bus may be a bidirectional communication bus. The bus converts to-be-transmitted data between serial communication and parallel communication. In some embodiments, the UART interface is usually configured to connect the processor 110 and the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through the Bluetooth headset.

The MIPI interface may be configured to connect the processor 110 and a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI, to implement a display function of the electronic device 100.

The GPIO interface may be configured by using software. The GPIO interface may be configured as a control signal, or may be configured as a data signal. In some embodiments, the GPIO interface may be configured to connect the processor 110 and the camera 193, the display 194, the wireless communication module 160, the audio module 170, the sensor module 180, or the like. The GPIO interface may be further configured as the I2C interface, the I2S interface, the UART interface, the MIPI interface, or the like.

The SIM interface may be configured to communicate with the SIM card interface 195, to implement a function of transmitting data to the SIM card or reading data from the SIM card.

The USB port 130 is an interface that conforms to a USB standard specification, and may be specifically a mini USB port, a micro USB port, a USB Type C port, or the like. The USB port 130 may be configured to be connected to the charger to charge the electronic device 100, or may be configured to transmit data between the electronic device 100 and a peripheral device, or may be configured to be connected to a headset, to play audio by using the headset. The interface may be further configured to be connected to another electronic device, for example, an AR device.

It can be understood that an interface connection relationship between the modules that is shown in this embodiment of this application is merely an example for description, and does not constitute a limitation on the structure of the electronic device 100. In some other embodiments of this application, different interface connection manners in the foregoing embodiments or a combination of a plurality of interface connection manners may alternatively be used for the electronic device 100.

The charging management module 140 is configured to receive a charging input from the charger. The charger may be a wireless charger or a wired charger.

The power management module 141 is configured to be connected to the battery 142, the charging management module 140, and the processor 110. The power management module 141 receives an input from the battery 142 and/or the charging management module 140, and supplies power to the processor 110, the internal memory 121, the external memory, the display 194, the camera 193, the wireless communication module 160, or the like.

A wireless communication function of the electronic device 100 may be implemented by using the antenna 1, the antenna 2, the mobile communication module 150, the wireless communication module 160, the modem processor, the baseband processor, or the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communication module 150 may provide a wireless communication solution that is applied to the electronic device 100 and that includes 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal obtained after modulation by the modem processor, and convert the signal into an electromagnetic wave for radiation through the antenna 1. In some embodiments, at least some functional modules of the mobile communication module 150 may be disposed in the processor 110. In some embodiments, at least some functional modules in the mobile communication module 150 may be disposed in a same device as at least some modules in the processor 110.

The modem processor may include a modulator and a demodulator. The modulator is configured to modulate a to-be-sent low-frequency baseband signal into a medium/high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in the same device as the mobile communication module 150 or another functional module.

The wireless communication module 160 may provide a wireless communication solution that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communication module 160 may be one or more components integrating at least one communication processing module. The wireless communication module 160 receives an electromagnetic wave through the antenna 2, modulates and filters an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 may implement a display function through the GPU, the display 194, the application processor, and the like. The GPU is a microprocessor for image processing, and is connected to the display 194 and the application processor. The GPU is configured to perform mathematical and geometric computation, and is configured to perform graphics rendering. The processor 110 may include one or more GPUs, and execute a program instruction to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a miniLED, a microLED, a micro-OLED, a quantum dot light emitting diode (quantum dot light emitting diodes, QLED), or the like. In some embodiments, the electronic device 100 may include one or N displays 194, where N is a positive integer greater than 1.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into a standard image signal in a format of RGB, YUV, or the like. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform, or the like on energy of the frequency.

The video codec is configured to compress or decompress a digital video. The electronic device 100 may support one or more video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. The NPU may be used to implement applications such as intelligent cognition of the electronic device 100, for example, image recognition, facial recognition, voice recognition, and text understanding.

The internal memory 121 may include one or more random access memories (random access memory, RAM) and one or more nonvolatile memories (non-volatile memory, NVM).

The random access memory may include a static random-access memory (static random-access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a fifth generation DDR SDRAM is usually referred to as DDR5 SDRAM), and the like.

The nonvolatile memory may include a magnetic disk storage device and a flash memory (flash memory).

The flash memory may include NOR FLASH, NAND FLASH, 3D NAND FLASH, and the like based on an operating principle; may include a single-level cell (single-level cell, SLC), a multi-level cell (multi-level cell, MLC), a triple-level cell (triple-level cell, TLC), a quad-level cell (quad-level cell, QLC), and the like based on an order of a level of a storage unit; and may include a universal flash storage (English: universal flash storage, UFS), an embedded multimedia card (embedded multimedia Card, eMMC), and the like based on a storage specification.

The random access memory may be directly read and written by the processor 110, and may be configured to store an executable program (for example, a machine instruction) of an operating system or another running program, and may be further configured to store data of a user and data of an application.

The nonvolatile memory may store an executable program, data of a user and an application, and the like, and may be loaded into the random access memory in advance, so that the processor 110 directly performs reading and writing.

The external memory interface 120 may be configured to be connected to an external nonvolatile memory, to expand a storage capacity of the electronic device 100. The external nonvolatile memory communicates with the processor 110 through the external memory interface 120, to implement a data storage function. For example, a file such as music or a video is stored in the external nonvolatile memory.

The electronic device 100 may implement an audio function, for example, music playing or recording, by using the audio module 170, the speaker 170A, the receiver 170B, the microphone 170C, the headset jack 170D, the application processor, and the like.

The audio module 170 is configured to convert digital audio information into an analog audio signal for output, and is further configured to convert an analog audio input into a digital audio signal. The audio module 170 may be further configured to encode and decode the audio signal. In some embodiments, the audio module 170 may be disposed in the processor 110, or some functional modules of the audio module 170 may be disposed in the processor 110.

The speaker 170A, also referred to as a "horn", is configured to convert an electrical audio signal into a sound signal. The electronic device 100 may be configured to listen to music or answer a call in a hands-free mode by using the speaker 170A.

The receiver 170B, also referred to as an "earpiece", is configured to convert an electrical audio signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending audio information, a user may make a sound near the microphone 170C through the mouth of the user, to enter a sound signal into the microphone 170C. At least one microphone 170C may be disposed in the electronic device 100. In some other embodiments, the electronic device 100 may be provided with two microphones 170C, to implement a noise reduction function in addition to collecting a sound signal. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to be connected to a wired headset. The headset jack 170D may be a USB port 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messaging application icon, an instruction for viewing an SMS message is executed. When a touch operation whose touch operation intensity is greater than or equal to the first pressure threshold is performed on the Messaging application icon, an instruction for newly creating an SMS message is executed.

The gyro sensor 180B may be configured to determine a moving posture of the electronic device 100. In some embodiments, an angular velocity of the electronic device 100 around three axes (that is, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may be further used in a navigation scenario and a motion sensing game scenario.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some embodiments, when the electronic device 100 is a flip phone, the electronic device 100 may detect opening and closing of a flip cover based on the magnetic sensor 180D, and further set features such as automatic unlocking of the flip cover based on a detected opening and closing state of the leather case or opening and a detected opening and closing state of the flip cover.

The acceleration sensor 180E may detect an acceleration value of the electronic device 100 in various directions (usually on three axes). When the electronic device 100 is still, a magnitude and a direction of gravity may be detected. The acceleration sensor 180E may be further configured to recognize a posture of the electronic device, and is applied to applications such as switching between a landscape mode and a portrait mode and a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F, to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor near the temperature sensor 180J, to reduce power consumption and implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor. The touch sensor may transfer the detected touch operation to the application processor, to determine a type of a touch event. A visual output related to the touch operation may be provided through the display 194. In some other embodiments, the touch sensor 180K may alternatively be disposed on a surface of the electronic device 100, and is located at a location different from that of the display 194.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing or audio playing) may correspond to different vibration feedback effects. The motor 191 may also correspond to different vibration feedback effects for touch operations performed on different areas of the display 194. Different application scenarios (for example, a time reminder, receiving information, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to be connected to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at a same time. The plurality of cards may be of a same type or different types. The SIM card interface 195 is compatible with different types of SIM cards. The SIM card interface 195 is also compatible with an external storage card. The electronic device 100 interacts with a network by using the SIM card, to implement functions such as conversation and data communication.

In this embodiment of this application, the processor 110 may invoke a computer instruction stored in the internal memory 121, so that the electronic device 100 performs a file sharing method in embodiments of this application.

Figure 9:
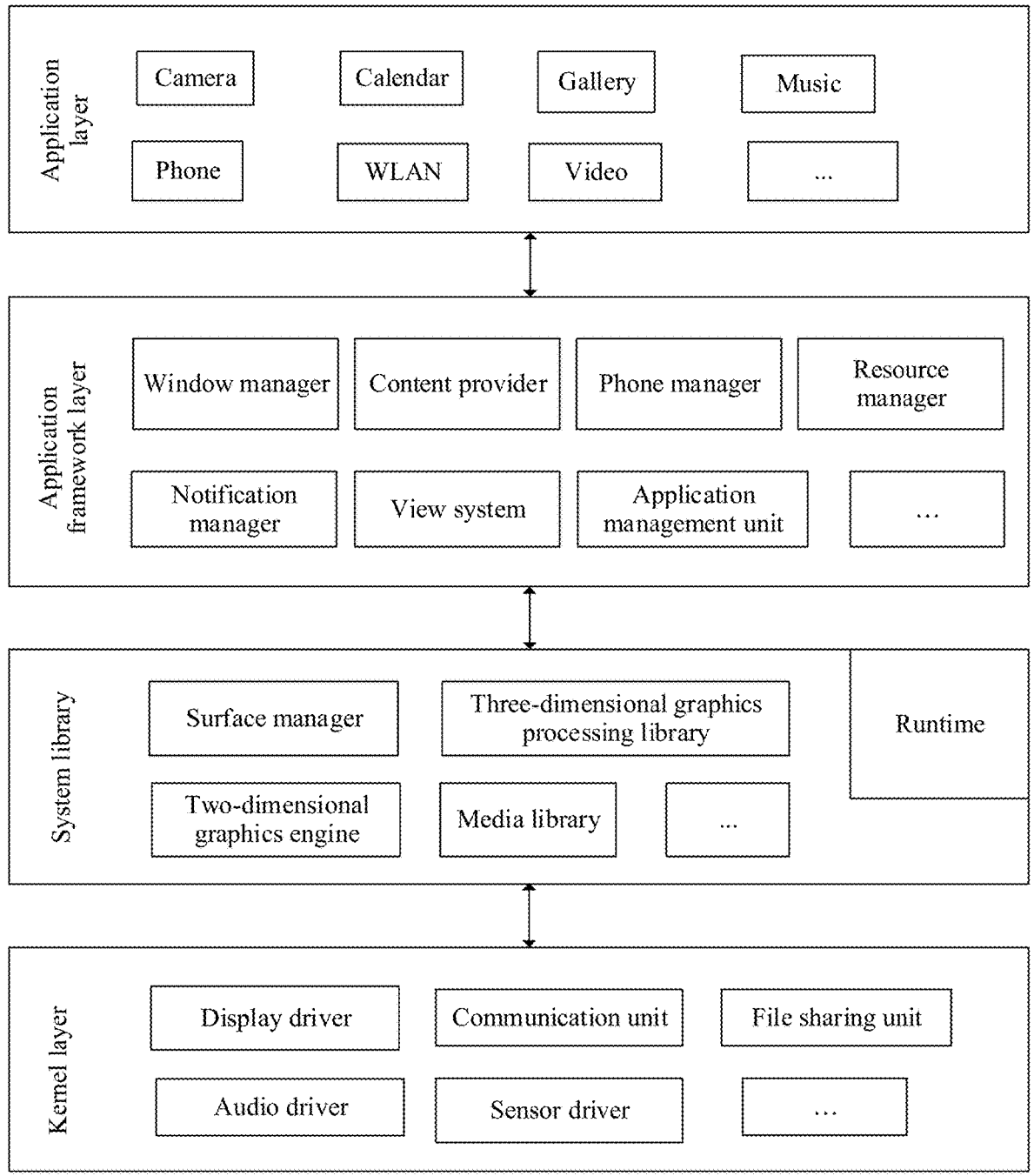
FIG. 9 is a schematic diagram of a software structure framework of an electronic device 100 according to an embodiment of this application.

FIG. 9 is a block diagram of a software structure of an electronic device 100 according to an embodiment of this application.

In a layered architecture, software is divided into several layers, and each layer has a clear role and task. The layers communicate with each other through a software interface. In some embodiments, a system is divided into four layers, and the four layers are respectively an application layer, an application framework layer, a runtime (Runtime) and system library layer, and a kernel layer from top to bottom.

The application layer may include a series of application packages.

As shown in FIG. 9, the application packages may include applications (which may also be referred to as applications) such as Camera, Gallery, Calendar, Phone, Maps, Navigation, WLAN, Bluetooth, Music, Video, and Messaging.

The application framework layer provides an application programming interface (application programming interface, API) and a programming framework for an application at the application layer. The application framework layer includes some predefined functions.

As shown in FIG. 9, the application framework layer may include a window manager, a content provider, a view system, a phone manager, a resource manager, a notification manager, and the like.

The window manager is configured to manage a window program. The window manager may obtain a size of a display, and determine whether there is a status bar, a lock screen, a screen capture, or the like.

The content provider is configured to store and obtain data, so that the data can be accessed by an application. The data may include a video, an image, audio, a made call, an answered call, a browsing history and bookmark, a phonebook, and the like.

The view system includes a visual control, for example, a control for displaying a text, or a control for displaying a picture. The view system may be configured to construct an application. A display interface may include one or more views. For example, a display interface including an SMS message notification icon may include a view for displaying a text and a view for displaying a picture.

The phone manager is configured to provide a communication function for the electronic device 100, for example, management of a call status (including an answered state, a declined state, or the like).

The resource manager provides various resources for the application, for example, a localized string, an icon, a picture, a layout file, and a video file.

The notification manager enables the application to display notification information in the status bar, and may be configured to convey a notification-type message. The displayed notification information may automatically disappear after a short pause without a need to perform user interaction. For example, the notification manager is configured to notify download completion, provide a message notification, and the like. The notification manager may alternatively be a notification that appears in a top status bar of the system in a form of a graph or a scroll bar text, for example, a notification of an application that is run on a background, or may be a notification that appears on the screen in a form of a dialog interface. For example, text information is prompted in the status bar, a prompt tone is produced, the electronic device vibrates, or an indicator blinks.

In this embodiment of this application, the application framework layer may further include an application management unit.

The application management unit may be configured to collect a list of installed applications in each electronic device in a device group and file types associated with the applications; and may send, by using a communication unit, the list of installed applications in the electronic device and the file types associated with the applications to another networked electronic device in the device group or a network server. In addition, the application management unit further has a capability of starting an application on the electronic device.

In some embodiments, the application management unit may alternatively be located at another layer of the layered architecture. This is not limited herein.

The runtime (Runtime) includes a core library and a virtual machine. The runtime is responsible for scheduling and management of the system.

The core library includes two parts: One part is a function that needs to be called in programming language (for example, java language), and the other part is a core library of the system.

The application layer and the application framework layer run on the virtual machine. The virtual machine converts a programming file (for example, a java file) at the application layer and the application framework layer into a binary file for execution. The virtual machine is configured to perform functions such as object lifecycle management, stack management, thread management, security and abnormality management, and garbage collection.

The system library may include a plurality of functional modules such as a surface manager (surface manager), a media library (Media Libraries), a three-dimensional graphics processing library (for example, OpenGL ES), and a two-dimensional graphics engine (for example, SGL).

The surface manager is configured to: manage a display subsystem, and provide fusion of a two-dimensional (2-Dimensional, 2D) layer and a three-dimensional (3-Dimensional, 3D) layer for a plurality of applications.

The media library supports playback and recording of a plurality of common audio and video formats, a static image file, and the like. The media library supports multiple audio and video encoding formats such as MPEG-4, H.264, MP3, AAC, AMR, JPG, and PNG.

The three-dimensional graphics processing library is configured to implement 3D graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, a sensor driver, and a virtual card driver.

The kernel layer may further include a communication unit and a file sharing unit.

The communication unit may be configured to: establish a communication link to another electronic device in the device group, receive and send data, and the like.

The file sharing unit may be configured to share a file on the electronic device with the another electronic device in the device group by using the communication unit. In some embodiments, the file sharing unit may create a mapping file of a shared file, and share the mapping file with the another electronic device in the device group. In some embodiments, the file sharing unit and the another electronic device may form a distributed file system.

In some embodiments, the communication unit and the file sharing unit may alternatively be located at another layer of the layered architecture. This is not limited herein.

Figure 10:
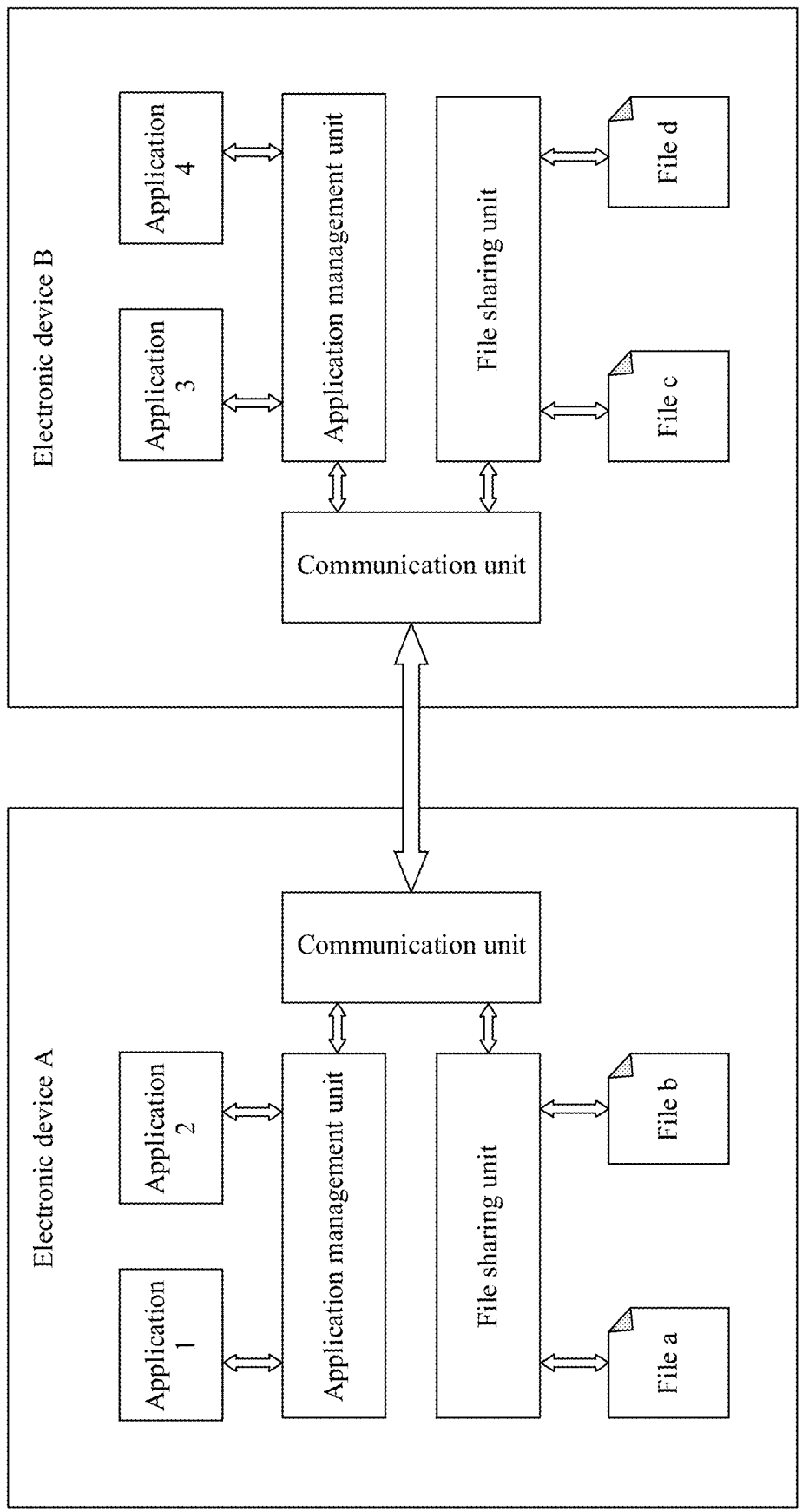
FIG. 10 is a schematic diagram of dual-machine interaction according to an embodiment of this application.

FIG. 10 is a schematic diagram of dual-machine interaction according to an embodiment of this application.

An electronic device A and an electronic device B may form a device group by using a communication unit.

An application management unit of the electronic device A may collect installed applications (for example, an application 1 and an application 2) in the electronic device and file types associated with the applications, store a correspondence between an installed application and a file type associated with the application, and may send the correspondence between an installed application and a file type associated with the application to the electronic device B by using the communication unit.

Similarly, an application management unit of the electronic device B may also collect installed applications (for example, an application 3 and an application 4) in the electronic device and file types associated with the applications, store a correspondence between an installed application and a file type associated with the application, and may send the correspondence between an installed application and a file type associated with the application to the electronic device A by using the communication unit.

The application management unit of the electronic device A may store a device-application-file type correspondence, and a correspondence between an installed application on the electronic device A and the electronic device B and a file type associated with the application is recorded in the device-application-file type correspondence.

Figure 11:
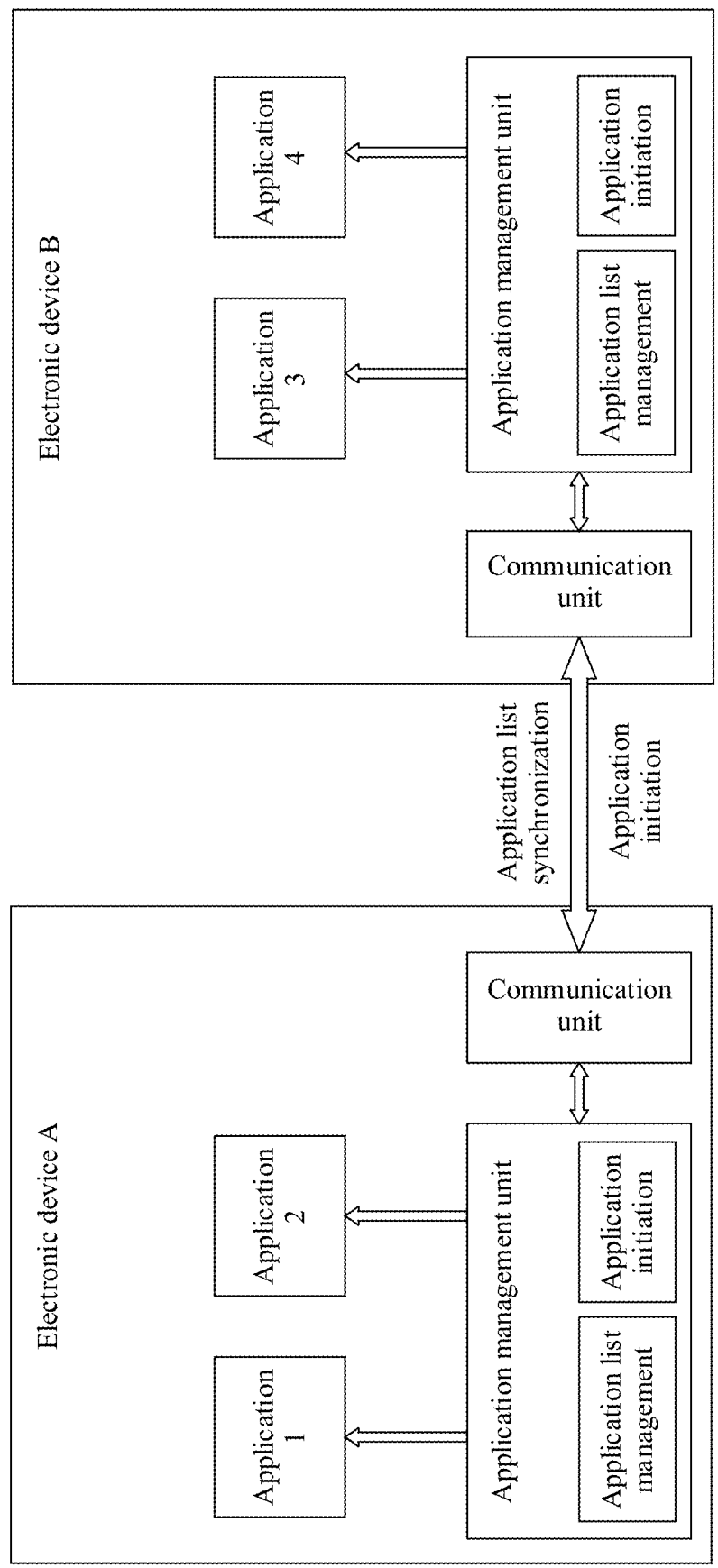
FIG. 11 is another schematic diagram of dual-machine interaction according to an embodiment of this application.

Specifically, in some embodiments, the application management unit may include an application list management module and an application starting module. FIG. 11 is another schematic diagram of dual-machine interaction according to an embodiment of this application.

The application list management module may be configured to store the device-application-file type correspondence. In some embodiments, the application list management module may be configured to store a correspondence among an electronic device, an online status, an installed application, and a file type associated with the application. For descriptions of the device-application-file type correspondence and the correspondence among an electronic device, an online status, an installed application, and a file type associated with the application, refer to descriptions of "(1) Installed application on an electronic device and a file type associated with the application" and "(3) Online status of an electronic device in a device group" in the foregoing descriptions of terms. Details are not described herein again.

The application starting module may be configured to start an application on the electronic device.

For example, when the electronic device A needs to open a file (for example, a file a), the electronic device A may invoke the communication unit to determine a currently online electronic device in the device group. After determining that the electronic device B is online, the electronic device A may invoke the application management unit to determine, from the device-application-file type correspondence recorded by the application list management module in the application management unit, an application that is associated with the file a and that is in the electronic device A and the electronic device B, and display the application on a display 194 of the electronic device A. For example, the electronic device A may determine that both the application 1 in the electronic device A and the application 3 in the electronic device B are associated with the file a, and display icons of the application 1 and the application 3 on the display 194.

After a user chooses, on the electronic device A, to open the file a by using the application 3 in the electronic device B, the application management unit of the electronic device A may notify, by using the communication unit, the electronic device B to start the application 3 selected by the user, and may send a path of the file a to the application 3 in the electronic device B.

The electronic device B may start the application 3 by using the application starting module in the application management unit, and open the file a by using the application 3.

Specifically, in some embodiments, the electronic device A may send a path of a mapping file of the file a to the application 3 in the electronic device B by using a file sharing unit in the electronic device A and the electronic device B.

Figure 12:
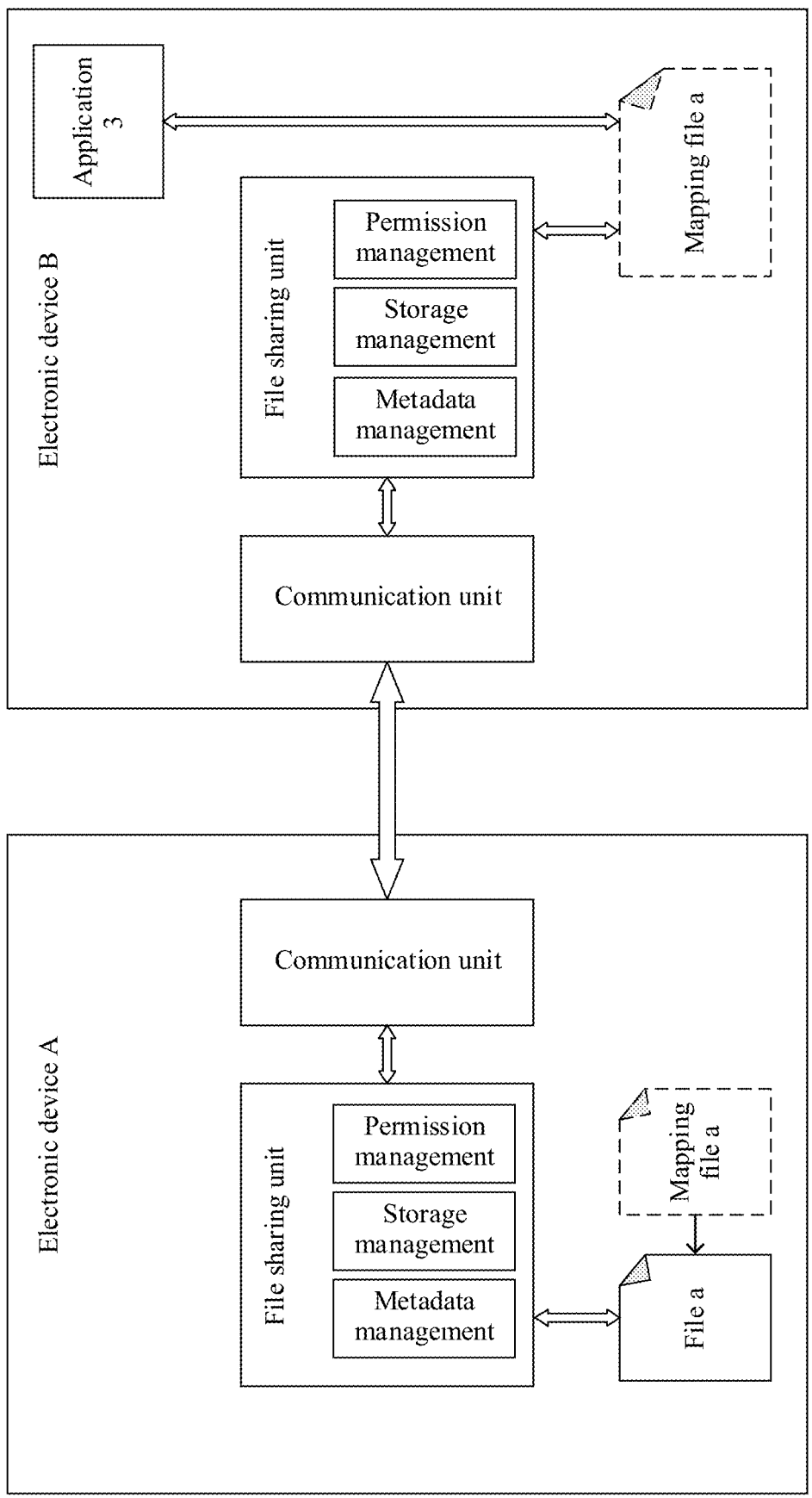
FIG. 12 is another schematic diagram of dual-machine interaction according to an embodiment of this application.

FIG. 12 is another schematic diagram of dual-machine interaction according to an embodiment of this application.

The file sharing unit may include a metadata management module, a storage management module, and a permission management module.

The metadata management module may be configured to manage metadata information of a file on the electronic device. The metadata information of the file includes a path of the file.

It can be understood that the metadata information is one type of file access information. In this embodiment of this application, the metadata information is used as an example. In an actual application, there may be other file access information that may be used to uniquely locate a file. This is not limited herein.

The storage management module may be configured to: create a mapping file for the file, and manage access and a modification to the file or the mapping file stored in the electronic device.

The permission management module may be configured to set access permission for the file on the electronic device.

Optionally, the file sharing unit may be a file system, for example, a file system mounted in a distributed file system.

For example, after the user chooses, on the electronic device A, to open the file a by using the application 3 in the electronic device B, the storage management module in the file sharing unit of the electronic device A may create a mapping file a for the file a, and all access to the mapping file a points to the file a. The metadata management module may generate metadata information of the mapping file a. The metadata information of the mapping file a may include an identifier of the electronic device A, a path of the mapping file a, an identifier of the file a, and a path of the file a.

Optionally, when the mapping file is created, the permission management module may specify an application identifier of the mapping file. After the metadata information of the mapping file a is sent to another electronic device, a file sharing unit of the another electronic device needs to authenticate an accessing application based on the application identifier, and only an application corresponding to the application identifier of the mapping file can access the mapping file. For example, when the mapping file a is created, the permission management module may specify that an application identifier of the mapping file a is a package name of the application 3. Therefore, after the metadata information of the mapping file a is sent to the another electronic device, only the application 3 can access the mapping file a.

Then, the file sharing unit of the electronic device A may send the metadata information (including the identifier of the electronic device A) of the mapping file a and an identifier of the application 3 to the file sharing unit of the electronic device B by using the communication unit. In this way, the mapping file a is visible to the application 3 in the electronic device B.

When the application 3 in the electronic device B operates the mapping file a, the file sharing unit of the electronic device B may send an operation request to the file sharing unit of the electronic device A based on the identifier of the electronic device A in the metadata information of the mapping file a.

The storage management module in the file sharing unit of the electronic device A may operate the file a based on the path of the file a in the metadata information of the mapping file a, and return an operation result to the file sharing unit of the electronic device B. The file sharing unit of the electronic device B may return the operation result to the application 3.

The following specifically describes a file sharing method in an embodiment of this application with reference to the foregoing example software and hardware structures of the electronic device 100.

Figure 13:
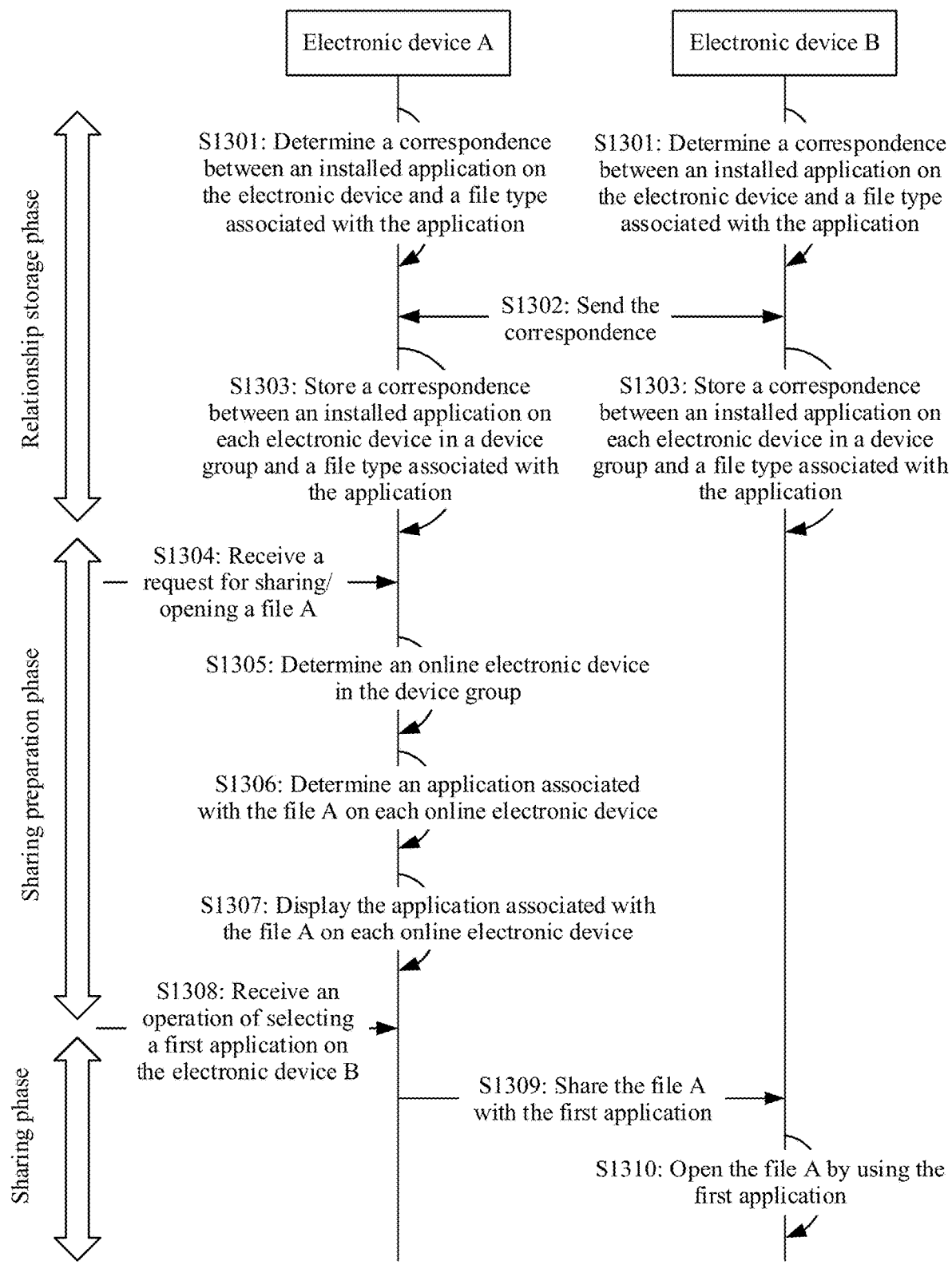
FIG. 13 is a schematic diagram of signaling interaction in a file sharing method according to an embodiment of this application.

FIG. 13 is a schematic diagram of signaling interaction in a file sharing method according to an embodiment of this application.

The file sharing method in this embodiment of this application may be divided into three phases: (1) Relationship storage phase; (2) Sharing preparation phase; and (3) Sharing execution phase. The following separately describes the three phases in detail by using an example in which an electronic device A and an electronic device B in a device group are online and the electronic device A needs to share a file with the electronic device B.

(1) Relationship Storage Phase:

S1301: Determine a correspondence between an installed application on an electronic device and a file type associated with the application.

Each electronic device in the device group may determine a correspondence between an installed application on the electronic device and a file type associated with the application.

For descriptions of the correspondence between an installed application on the electronic device and a file type associated with the application, refer to descriptions of "1.3. Correspondence between an installed application and a file type associated with the application" in "(1) Installed application on an electronic device and a file type associated with the application" in the foregoing descriptions of terms. Details are not described herein again.

S1302: Send the correspondence between an installed application on an electronic device and a file type associated with the application to another electronic device.

Each electronic device in the device group may send a correspondence between an installed application on the electronic device and a file type associated with the application to another electronic device in the device group.

In some embodiments, the correspondence between an installed application on an electronic device and a file type associated with the application may not be sent to the another electronic device in the device group, but is sent to a network server. This is not limited herein.

Specifically, in some embodiments, the electronic device may store, in application association information, the correspondence between an installed application on the electronic device and a file type associated with the application, and send the application association information to the another electronic device or the network server. This is not limited herein.

S1303: Store a correspondence between an installed application on each electronic device in a device group and a file type associated with the application.

After receiving a correspondence that is between an installed application on another electronic device in a device group and a file type associated with the application and that is sent by the another electronic device, the electronic device may store the correspondence. A correspondence among an electronic device, an installed application, and a file type associated with the application may be obtained.

For descriptions of the correspondence among an electronic device, an installed application, and a file type associated with the application, refer to descriptions of 1.4. Correspondence among an electronic device, an installed application, and a file type associated with the application in "(1) Installed application on an electronic device and a file type associated with the application" in the foregoing descriptions of terms. Details are not described herein again.

In some embodiments, step S1303 may be performed by the network server. This is not limited herein.

It can be understood that, after an electronic device in the device group updates an installed application on the electronic device (for example, a new application is installed or an application is deleted), S1301 to S1303 may be triggered to be performed again, so that the correspondence that is among an electronic device, an installed application, and a file type associated with the application and that is stored in each electronic device in the device group is in a latest state.

After (1) Relationship storage phase is completed, each electronic device in the device group may store a correspondence among the electronic device, an installed application, and a file type associated with the application, or the network server stores a correspondence among the electronic device, an installed application, and a file type associated with the application. (2) Sharing preparation phase may start.

(2) Sharing Preparation Phase:

S1304: The electronic device A receives a request for sharing/opening a file A.

When the electronic device A may receive the request for sharing or opening the file A, step S1305 may be performed. The file A is a file on the electronic device A.

S1305: The electronic device A determines an online electronic device in the device group.

When the electronic device A may receive the request for sharing or opening the file A, the electronic device A may first determine the online electronic device in the device group.

The electronic device A may determine the online electronic device in the current device group by using a stored online status of the electronic device in the device group. For descriptions of the online status that is of the electronic device in the device group and that is stored in the electronic device A, refer to (3) Online status of an electronic device in a device group in the foregoing descriptions of terms. Details are not described herein again.

For example, if the online status that is of the electronic device in the device group and that is currently stored in the electronic device A is shown in Table 3, the electronic device A may determine that online electronic devices in the device group are the electronic device B and an electronic device C.

S1306: The electronic device A determines an application associated with the file A on each online electronic device.

The electronic device A may determine the application associated with the file A on each online electronic device based on a file type of the file A and based on a correspondence that is among an electronic device in the device group, an installed application, and a file type associated with the application and that is stored in the electronic device A, or by querying the correspondence that is among an electronic device in the device group, an installed application, and a file type associated with the application and that is stored in the network server.

For example, it is assumed that the file type of the file A is an rmvb file. It is assumed that the device group includes the electronic device A, the electronic device B, and the electronic device C.

Table 4 shows an example of the correspondence that is among an electronic device, an installed application, and a file type associated with the application and that is stored in the electronic device A.

TABLE 4

| Electronic device | Installed application | File type associated with an application |
| --- | --- | --- |
| Electronic device A | Application 1 | mp4 and rmvb |
|  | Application 2 | text, doc, and pdf |
|  | Application 3 | mp3 |
| Electronic device B | Application 4 | avi, mp4, and rmvb |
|  | Application 5 | doc and pdf |
|  | Application 6 | mp3, flac, and rmvb |
| Electronic device C | Application 7 | text |
|  | Application 8 | mp3 and rmvb |

Table 5 shows an example of the online status that is of the electronic device in the device group and that is stored in the electronic device A:

TABLE 5

| Electronic device | Online status |
| --- | --- |
| Electronic device B | Online |
| Electronic device C | Offline |

In some other embodiments, the electronic device A may use a correspondence that is among an electronic device, an online status, an installed application, and a file type associated with the application and that is shown in Table 6 to reflect both a device-application-file type correspondence shown in Table 4 and an online status correspondence shown in Table 5.

TABLE 6

| Electronic device | Online status | Installed application | File type associated with an application |
| --- | --- | --- | --- |
| Electronic device A | Online | Application 1 | mp4 and rmvb |
|  |  | Application 2 | text, doc, and pdf |
|  |  | Application 3 | mp3 |
| Electronic device B | Online | Application 4 | avi, mp4, and rmvb |
|  |  | Application 5 | doc and pdf |
|  |  | Application 6 | mp3, flac, and rmvb |
| Electronic device C | Offline | Application 7 | text |
|  |  | Application 8 | mp3 and rmvb |

It can be understood that Table 4, Table 5, and Table 6 show merely examples of the correspondences. In an actual application, these correspondences may be represented and stored in many different forms. This is not limited herein.

Based on the correspondences shown in Table 4 and Table 5 or the correspondence shown in Table 6, with reference to a case in which the file type of the file A is an rmvb file, the electronic device A may determine that applications associated with the file A in currently online electronic devices in the device group include the application 1 in the electronic device A and the application 4 and the application 6 in the electronic device B.

S1307: The electronic device A displays the application associated with the file A on each online electronic device.

The electronic device A determines the application associated with the file A on each online electronic device, and may display the application associated with the file A on each online electronic device, so that a user performs selection.

Preferably, during displaying, the electronic device A may display an identifier of each online electronic device, and display, in an area corresponding to the identifier of each online electronic device, the application associated with the file A in the online electronic device. Through such corresponding displaying, the user can conveniently determine that a specific application belongs to a specific electronic device in the device group.

Figure 14:
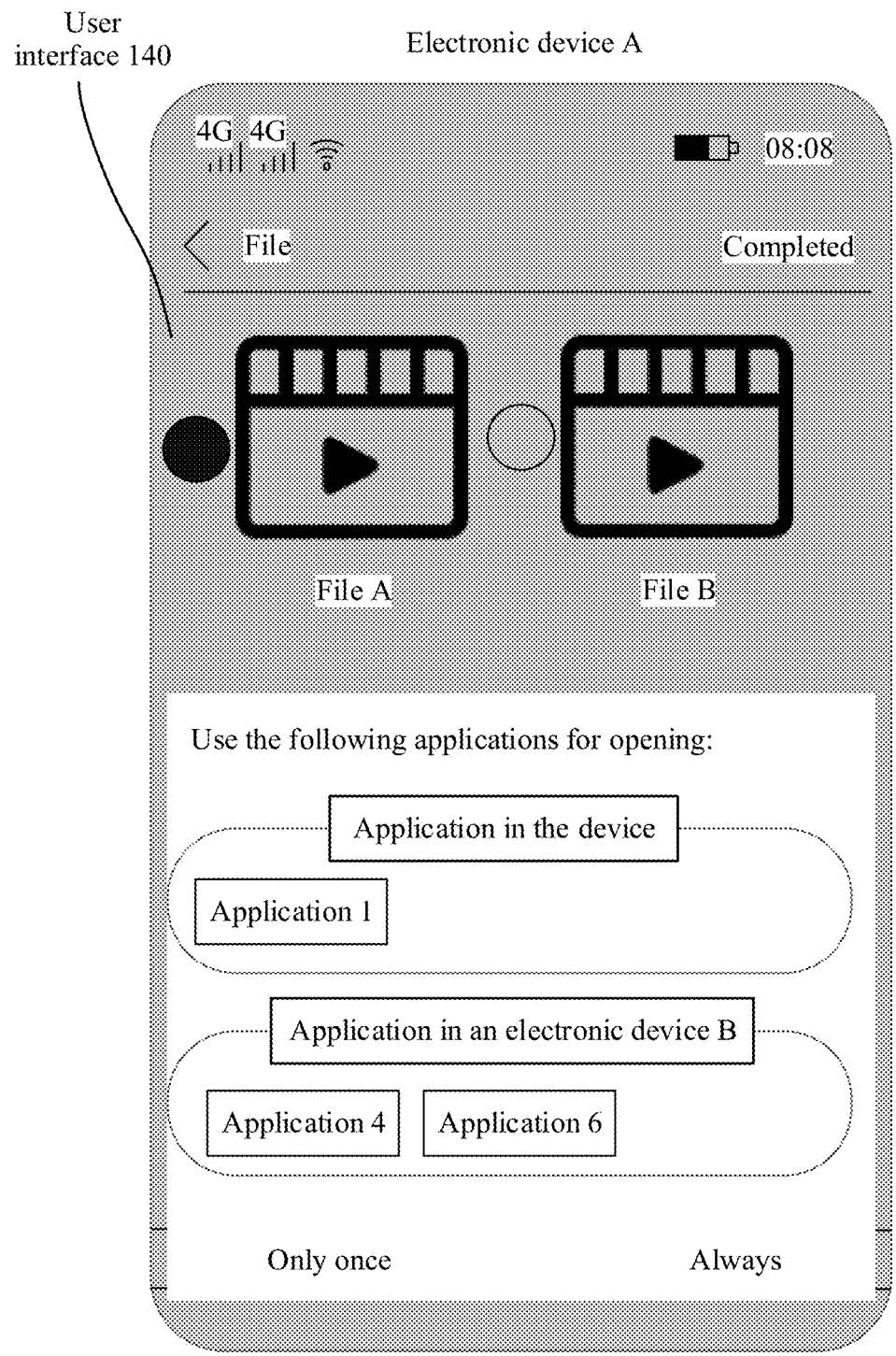
FIG. 14 is a schematic diagram of a user interface according to an embodiment of this application.

For example, FIG. 14 is a schematic diagram of a user interface according to an embodiment of this application. If the electronic device A determines that the application 1 in the electronic device A, the application 4 in the electronic device B, and the application 6 in the electronic device B are associated with the file A, as shown in FIG. 14, in a user interface 140 that is of the electronic device A and in which the user chooses to open the file A, the application 1 in the electronic device A may be displayed under an identifier of the electronic device A, and the application 4 and the application 6 in the electronic device B are displayed under an identifier of the electronic device B, so that the user selects a specific application on a specific electronic device to open the file A.

After (2) Sharing preparation phase is completed, an application that is associated with a file that the user wants to open and that is on the online electronic device in the device group is displayed on the electronic device A, so that the user performs selection. (3) Sharing phase may start.

(3) Sharing Phase:

S1308: The electronic device A receives an operation of selecting a first application on the electronic device B.

After the electronic device A displays the application associated with the file A on each online electronic device, the electronic device A may receive the operation of selecting the first application on the electronic device B by the user.

Figure 15:
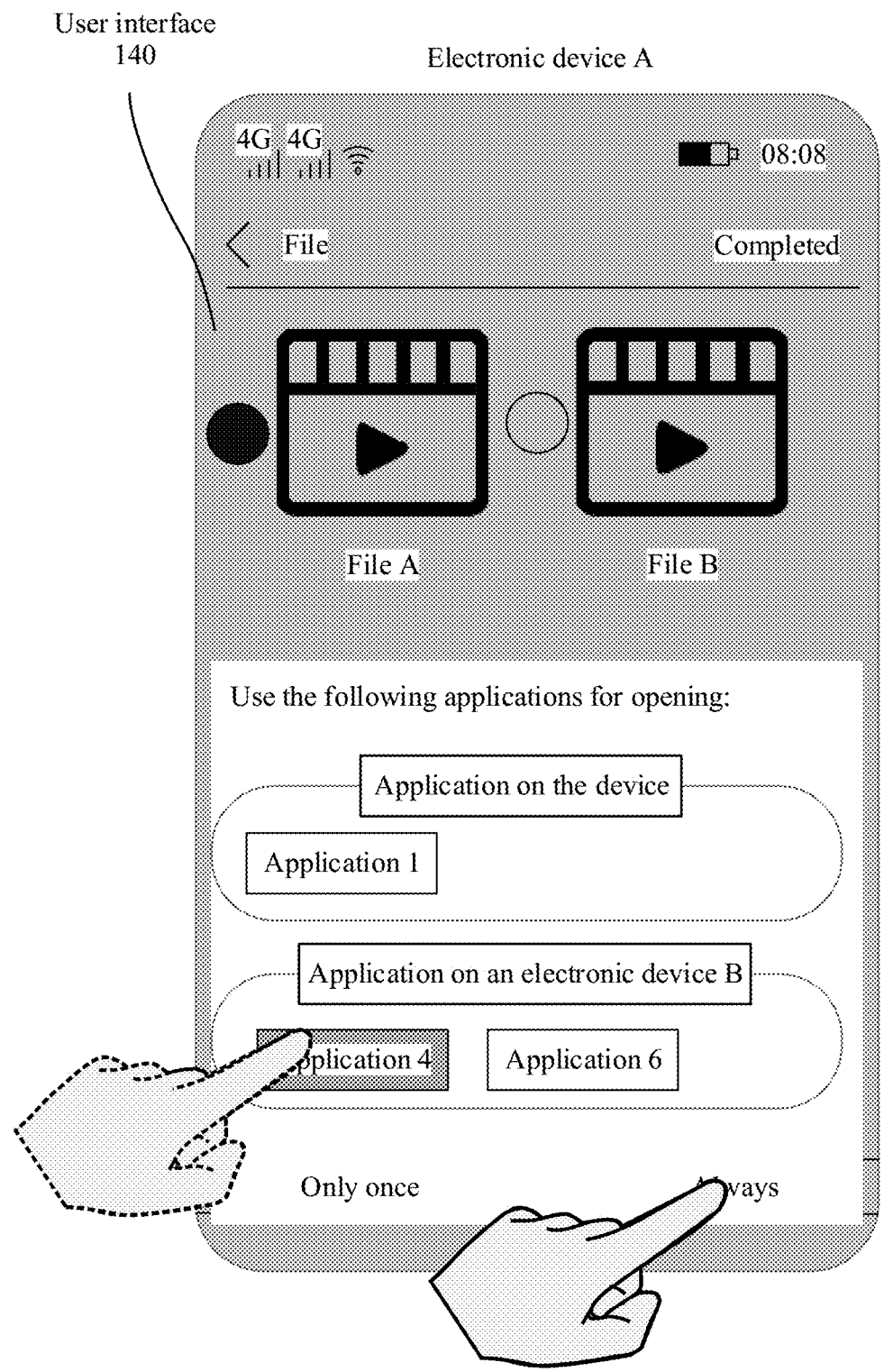
FIG. 15 is a schematic diagram of another user interface according to an embodiment of this application.

For example, FIG. 15 is a schematic diagram of a user interface according to an embodiment of this application. In the user interface 140 that is of the application 1, the application 4, and the application 6 that are associated with the file A and that is displayed on the electronic device A, an operation that the user chooses to use the application 4 to open the file A may be received.

S1309: The electronic device A shares the file A with the first application.

After the electronic device A receives the operation of selecting the first application on the electronic device B, the electronic device A may share the file A with the first application on the electronic device B.

Specifically, the electronic device A may send an identifier of the file A and an identifier of the first application to the electronic device B.

Optionally, the electronic device A may send a path of the file A and the identifier of the first application to the electronic device B. The electronic device A may alternatively share the file A with the first application in another manner. This is not limited herein.

S1310: The electronic device B opens the file A by using the first application.

After receiving the file A shared by the electronic device A with the first application, the electronic device B may open the file A by using the first application.

In some embodiments, that the electronic device B opens the file A by using the first application may be as follows: The electronic device B accesses the file A by using the first application. Specifically, accessing the file A may be reading or writing the file A. This is not limited herein.

Figure 16:
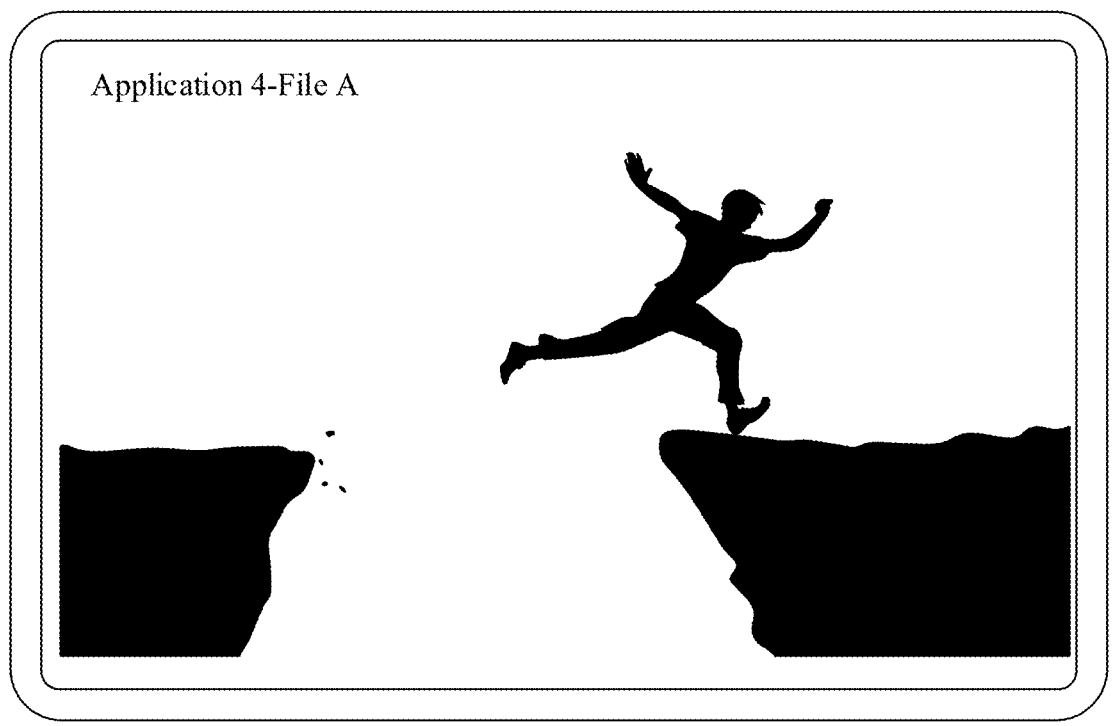
FIG. 16 is a schematic diagram of another user interface according to an embodiment of this application.

For example, FIG. 16 is a schematic diagram of another user interface according to an embodiment of this application. If the electronic device B is a tablet computer, after receiving the file A shared by the electronic device A with the application 4, the electronic device B may open the file A by using the application 4.

In this embodiment of this application, the electronic device A stores a correspondence between an installed application on another electronic device in the device group and a file type associated with the application, and an application supported by another online electronic device may be directly selected on the electronic device A to open a file that needs to be opened. In this way, more types of files can be quickly and conveniently shared with another electronic device in a cross-device manner and opened.

In the foregoing embodiment, in (3) Sharing phase, after the electronic device A receives the operation of selecting the first application on the electronic device B, the electronic device A may share the file A with the first application. In an actual application, there may be many manners of sharing the file A with the first application. The following specifically describes a preferred manner.

Preferred manner 1: Create a mapping file of a file A, and share the mapping file, to facilitate permission management.

Figure 17:
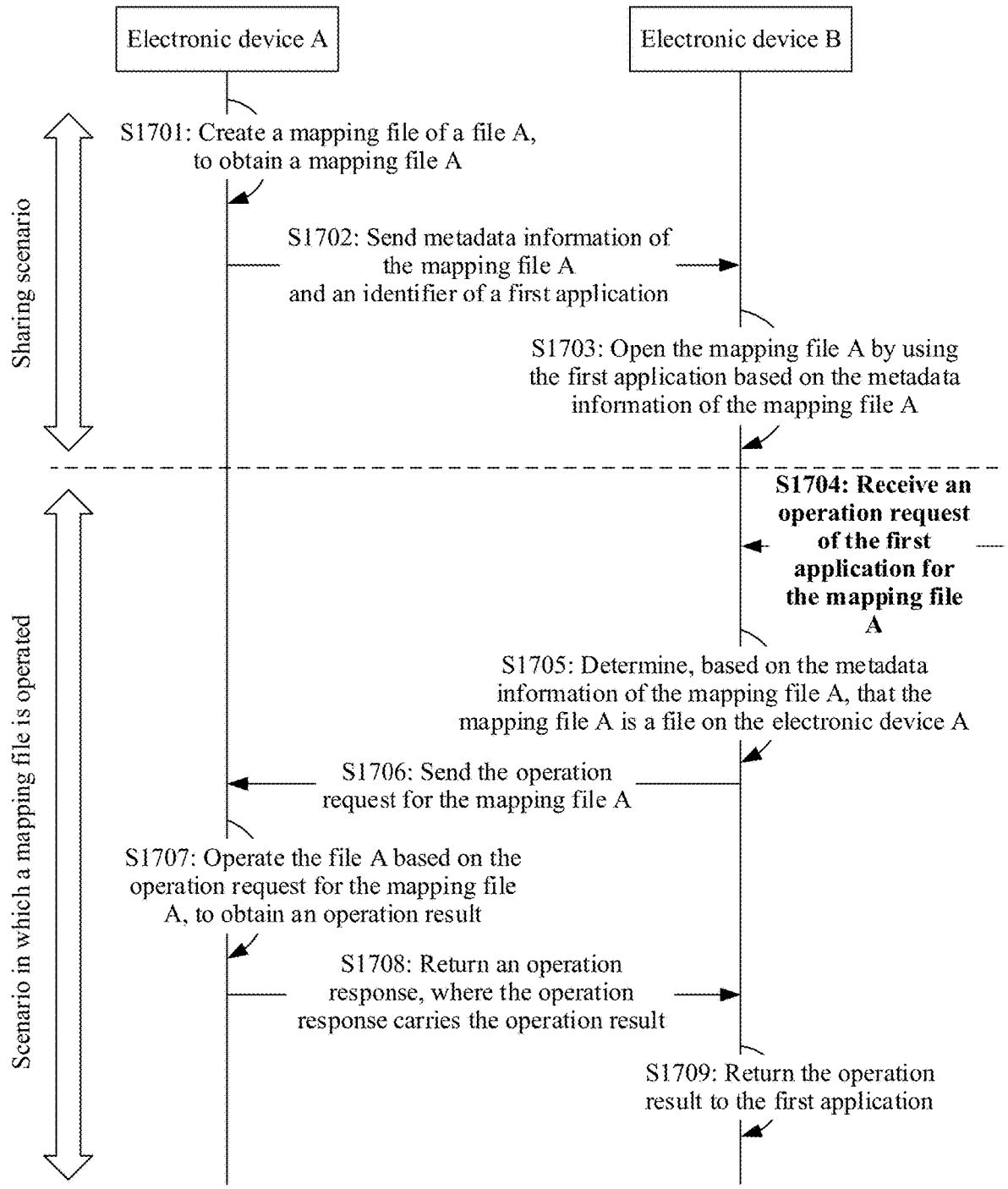
FIG. 17 is another schematic diagram of signaling interaction in a file sharing method according to an embodiment of this application.

The following describes Preferred manner 1 in two scenarios with reference to FIG. 17. (1) Sharing scenario: How to share the mapping file of the file A with an electronic device B is described. (2) Scenario in which a mapping file is operated: A process of operating the mapping file is described. It can be understood that, in some embodiments, (2) Scenario in which a mapping file is operated may not exist. This is not limited herein.

FIG. 17 is another schematic diagram of signaling interaction in a file sharing method according to an embodiment of this application.

Before the following steps are performed, an electronic device A may have performed steps S1301 to S1308. Details are not described herein again.

(1) Sharing Scenario:

S1701: The electronic device A creates a mapping file of a file A, to obtain a mapping file A.

After the electronic device A receives an operation of selecting a first application in an electronic device B, or when the electronic device A receives a request for sharing or opening the file A, the electronic device A may create the mapping file of the file A in a distributed file system, to obtain the mapping file A.

All accesses to the mapping file A points to the file A. For specific descriptions of the mapping file of the file, refer to descriptions of (5) Mapping file of a file in the foregoing descriptions of terms. Details are not described herein again.

It can be understood that, after creating the mapping file A, the electronic device may generate file access information of the mapping file A, for example, metadata information of the mapping file A. The metadata information of the mapping file A may include an identifier of the electronic device A, an identifier of the mapping file A, a path of the mapping file A, an identifier of the file A, a path of the file A, and the like. This is not limited herein.

Optionally, in some embodiments, after creating and obtaining the mapping file A based on an operation that a user chooses to open the file A by using the first application, the electronic device A may set access permission for the mapping file A to be that only the first application can access the mapping file A.

For example, the electronic device A may specify that an identifier of an application that may access the mapping file A is an identifier of the first application. Therefore, when accessing the mapping file A, another electronic device needs to authenticate an application that accesses the mapping file A. Only the first application that matches the identifier of the application that may access the mapping file A can access the mapping file A.

S1702: The electronic device A sends the metadata information of the mapping file A and the identifier of the first application to the electronic device B.

The first application is an application that is in the electronic device B and that is selected by the user to open the file A.

The identifier of the first application is used to uniquely identify the first application on the electronic device B, for example, may be one of an application name of the first application and a package name of the first application, a combination thereof, or the like. This is not limited herein.

S1703: The electronic device B opens the mapping file A by using the first application based on the metadata information of the mapping file A.

Because the metadata information of the mapping file A may include the identifier of the electronic device A, the path of the mapping file A, the identifier of the file A, the path of the file A, and the like, after the electronic device B receives the metadata information of the mapping file A, the electronic device B may access the mapping file A in the electronic device A based on the path of the mapping file A in the metadata information.

In some embodiments, if the electronic device A sets access permission for the mapping file A to be that only the first application can access the mapping file A, the electronic device B may perform authentication when the first application opens the mapping file A, and after determining that the first application can access the mapping file A (for example, after determining that the identifier of the first application is the same as the identifier of the application that may access the mapping file A), the electronic device B opens the mapping file A by using the first application.

Because access to the mapping file A points to the file A, an effect of opening the mapping file A is the same as an effect of opening the file A, and is also equivalent to opening the file A.

In (1) Sharing scenario, the electronic device A may create the mapping file A of the file A, may set access permission for the mapping file A, and open the mapping file A by using the first application selected by the user in the electronic device B. In this way, file security protection is improved in a cross-device file sharing process. In some embodiments, the file A may not only be played, but also may be operated. For example, when the file A is a file in a document format, after the first application on the electronic device B opens the mapping file A, an operation such as a modification may be performed on the mapping file A. For this process, refer to (2) Scenario in which a mapping file is operated.

(2) Scenario in which a Mapping File is Operated:

S1704: The electronic device B receives an operation request of the first application for the mapping file A.

After opening the mapping file A by using the first application, the electronic device B may receive the operation request of the first application for the mapping file A.

For example, the operation request may be an operation request of the user for modifying the mapping file A by using the first application, or an operation request of the user for adjusting a playing progress of the mapping file A by using the first application. This is not limited herein.

S1705: The electronic device B determines, based on the metadata information of the mapping file A, that the mapping file A is a file on the electronic device A.

After receiving the operation request of the first application for the mapping file A, the electronic device B may determine, based on the identifier of the electronic device A in the metadata information of the mapping file A, that the mapping file A is a file on the electronic device A.

S1706: The electronic device B sends the operation request for the mapping file A to the electronic device A.

After determining that the mapping file A is a file on the electronic device A, the electronic device B may send the operation request for the mapping file A to the electronic device A.

It can be understood that the operation request for the mapping file A may include the identifier of the mapping file A and an operation action.

Optionally, a request sent to the another electronic device may carry an information identification number, and when returning a response to the request, the response may carry a same information identification number, to indicate that the response is a response to the request.

S1707: The electronic device A operates the file A based on the operation request for the mapping file A, to obtain an operation result.

After receiving the operation request that is for the mapping file A and that is sent by the electronic device B, the electronic device A may determine, based on the metadata information of the mapping file A, that the mapping file A points to the file A. Then, the file A is operated based on the operation request for the mapping file A, and the operation result is obtained.

S1708: The electronic device A returns, to the electronic device B, an operation response carrying the operation result.

After operating the file A based on the operation request for the mapping file A and obtaining the operation result, the electronic device may return, to the electronic device B, the operation response carrying the operation result.

Optionally, the operation response may carry an information identification number that is the same as the information identification number in the operation request in S1706, to indicate that the operation response is a response to the operation request in S1706.

S1709: The electronic device B returns the operation result to the first application.

After receiving the operation response that carries the operation result and that is sent by the electronic device A, the electronic device B determines that the operation response is a response to the operation request for the mapping file A, and may return, to the first application, the operation result carried in the response.

In this embodiment of this application, when the file A needs to be shared with the first application on the electronic device B, the electronic device A may create the mapping file A for the file A, and may set, for the mapping file A, access permission that only the first application can access the mapping file A. Then, the electronic device A sends the metadata information of the mapping file A to the first application on the electronic device B. In this way, no other application on the electronic device B has permission to access the mapping file A, and only the first application can access the mapping file A, to ensure security of a file on the electronic device A after the file is shared in a cross-device manner.

Preferred manner 2: Use a distributed file system to share a file A, to improve sharing efficiency.

Figure 18:
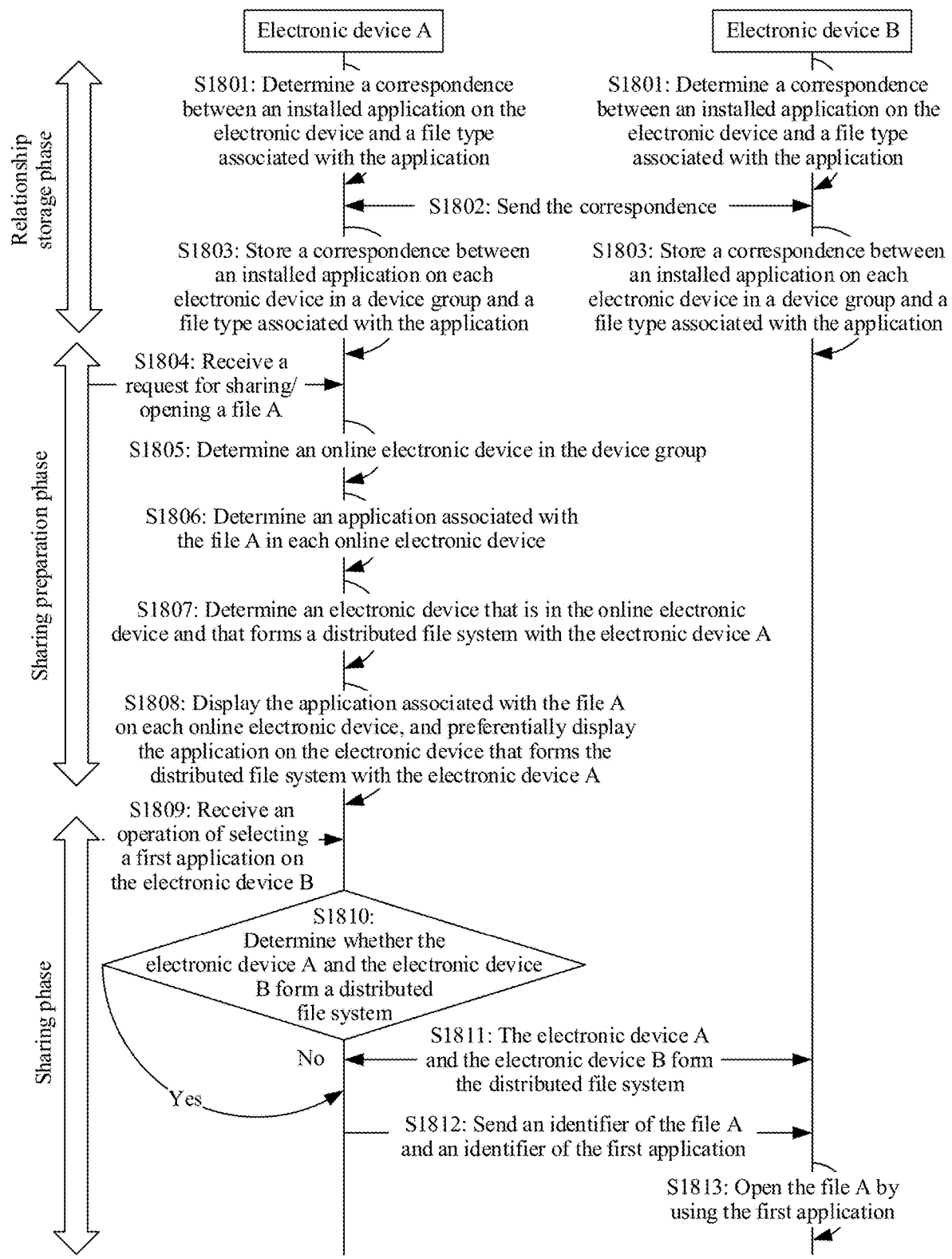
FIG. 18 is another schematic diagram of signaling interaction in a file sharing method according to an embodiment of this application.

FIG. 18 is another schematic diagram of signaling interaction in a file sharing method according to an embodiment of this application.

S1801: Determine a correspondence between an installed application on an electronic device and a file type associated with the application.

S1802: Send the correspondence between an installed application on an electronic device and a file type associated with the application to another electronic device.

S1803: Store a correspondence between an installed application on each electronic device in a device group and a file type associated with the application.

S1804: An electronic device A receives a request for sharing/opening a file A.

S1805: The electronic device A determines an online electronic device in the device group.

S1806: The electronic device A determines an application associated with the file A on each online electronic device.

Steps S1801 to S1806 are similar to steps S1301 to S1306, and details are not described herein again.

S1807: The electronic device A determines an electronic device that is in the online electronic device and that forms a distributed file system with the electronic device A.

Step S1807 may be performed on any occasion after step S1805 and before step S1808. This is not limited herein.

It can be understood that, after an electronic device and the electronic device A form a distributed file system, the distributed file system may provide a logical file system structure for a resource distributed at any location in each electronic device, so that a shared file distributed on each electronic device is accessed more conveniently.

S1808: The electronic device A displays the application associated with the file A on each online electronic device, and preferentially displays an application of the electronic device that forms the distributed file system with the electronic device A.

Optionally, that the electronic device A preferentially displays the application of the electronic device that forms the distributed file system with the electronic device A means that the electronic device that forms the distributed file system with the electronic device A is in preference to all electronic devices in the device group, and the application of the electronic device that forms the distributed file system with the electronic device A may be displayed at an uppermost location in an application selection control.

Preferably, that the electronic device A preferentially displays the application of the electronic device that forms the distributed file system with the electronic device A means that the electronic device that forms the distributed file system with the electronic device A is only in preference to another electronic device in the device group, and an application on the electronic device A may still be displayed at the uppermost location in the application selection control. An application on the electronic device that forms the distributed file system with the electronic device A may be displayed in preference to an application in another electronic device that does not form a distributed file system with the electronic device A.

Optionally, the electronic device A may display an identifier of each electronic device in an area corresponding to the application associated with the file A on each electronic device.

Optionally, when displaying the identifier of each electronic device, the electronic device A may further display a distributed identifier, to indicate that the electronic device and the electronic device A form a distributed file system.

For example, it is assumed that a file type of the file A is an rmvb file. It is assumed that the device group includes the electronic device A, an electronic device B, and an electronic device C. The electronic device A and the electronic device C form a distributed file system.

Table 7 shows an example of a correspondence that is among an electronic device, an online status, an installed application, and a file type associated with the application and that is currently stored in the electronic device A.

TABLE 7

| Electronic device | Online status | Installed application | File type associated with an application |
|---|---|---|---|
| Electronic device A | Online | Application 1 | mp4 and rmvb |
| | | Application 2 | text, doc, and pdf |
| | | Application 3 | mp3 |
| Electronic device B | Online | Application 4 | avi, mp4, and rmvb |
| | | Application 5 | doc and pdf |
| | | Application 6 | mp3, flac, and rmvb |
| Electronic device C | Online | Application 7 | text |
| | | Application 8 | mp3 and rmvb |

The electronic device A determines that applications associated with the file A in currently online electronic devices in the device group include the application 1 in the electronic device A, the application 4 and the application 6 in the electronic device B, and the application 8 in the electronic device C.

In addition, the electronic device A determines that the electronic device A and the electronic device C in the currently online electronic devices form a distributed file system.

Figure 19:
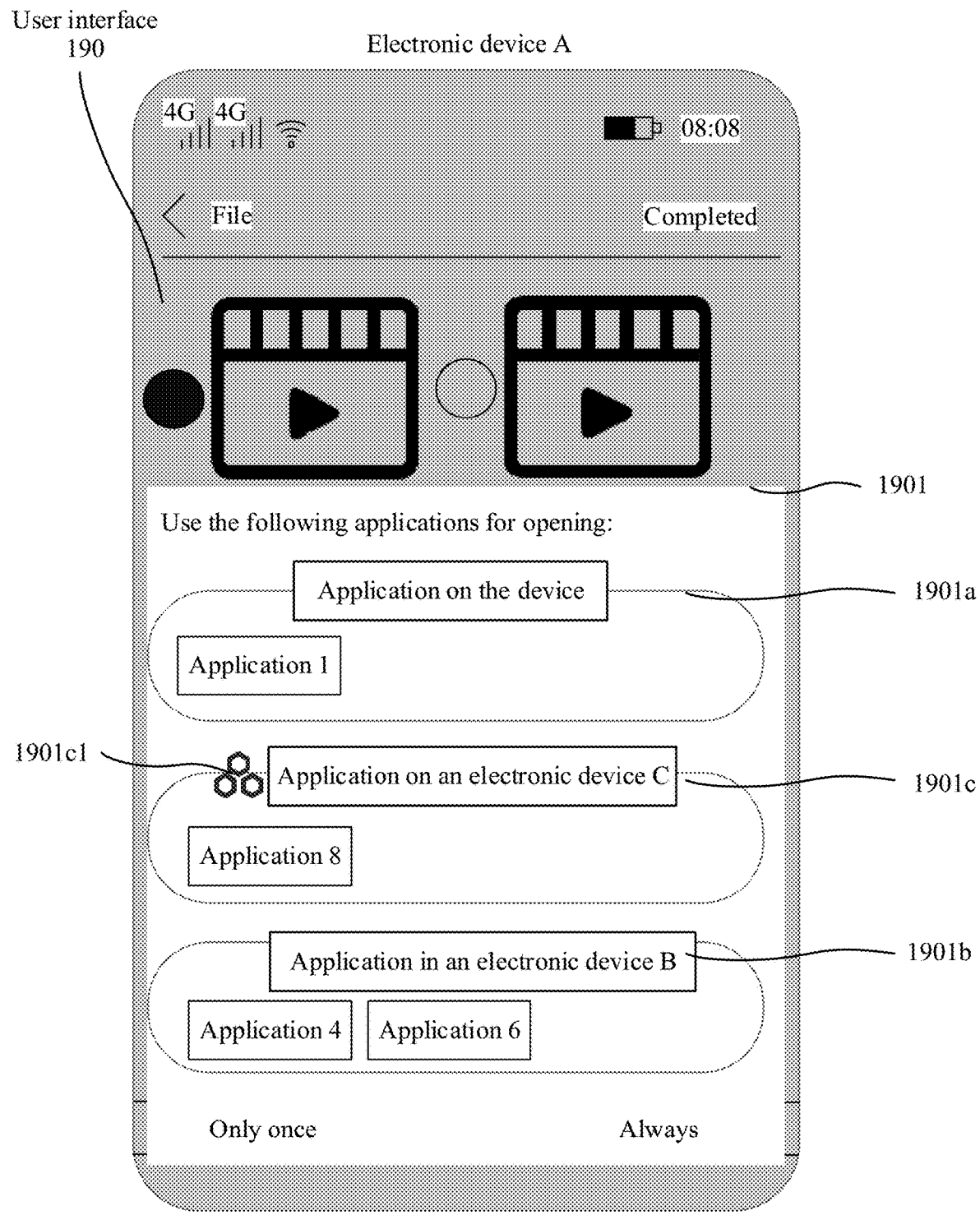
FIG. 19 is a schematic diagram of another user interface according to an embodiment of this application.

FIG. 19 shows another example user interface according to an embodiment of this application. A user interface 190 is a user interface in which a user chooses to open the file A. An application selection control 1901 is displayed in the user interface 190.

The application selection control 1901 is configured to display the application associated with the file A on each online electronic device, so that the user performs selection.

In the application selection control 1901, the identifier of each electronic device is displayed in the area corresponding to the application associated with the file A on each electronic device. The application selection control 1901 is divided into different areas, including:

a display area 1901a of an application on the device, configured to display an application associated with the file A in the electronic device A: the application 1;

a display area 1901c of an application on the electronic device C, configured to display an application associated with the file A in the electronic device C: the application 8; and a display area 1901b of an application on the electronic device B, configured to display applications associated with the file A in the electronic device B: the application 4 and the application 6.

A distributed identifier 1901c1 may be further displayed in the display area 1901c of an application on the electronic device C, to indicate that the electronic device C and the electronic device A form the distributed file system.

Because the electronic device C and the electronic device A form the distributed file system, but the electronic device B and the electronic device A do not form a distributed file system, in the application selection control 1901, the display area 1901c of an application on the electronic device C is displayed in preference to the display area 1901b of an application on the electronic device B.

S1809: The electronic device A receives an operation of selecting a first application on the electronic device B.

S1809 is similar to step S1308, and details are not described herein again.

S1810: The electronic device A determines whether the electronic device A and the electronic device B form a distributed file system.

When the electronic device A receives the operation of selecting the first application on the electronic device B by the user, the electronic device A may determine whether the electronic device A and the electronic device B form the distributed file system.

When determining that the electronic device A and the electronic device B do not form the distributed file system, the electronic device A may perform step S1811.

When determining that the electronic device A and the electronic device B form the distributed file system, the electronic device A may directly perform step S1812.

S1811: The electronic device A and the electronic device B establish the distributed file system.

When the electronic device A receives the operation of selecting the first application on the electronic device B by the user, and determines that the electronic device A and the electronic device B do not form a distributed file system, the electronic device A and the electronic device B establish the distributed file system.

It can be understood that, after an electronic device and the electronic device A form a distributed file system, the distributed file system may provide a logical file system structure for a resource distributed at any location in each electronic device, so that a shared file distributed on each electronic device is accessed more conveniently.

S1812: The electronic device A sends an identifier of the file A and an identifier of the first application to the electronic device B.

After determining that the electronic device A and the electronic device B form the distributed file system, the electronic device A may send the identifier of the file A and the identifier of the first application to the electronic device B.

Because the electronic device A and the electronic device B form the distributed file system, the electronic device B can determine a path of the file A only based on the identifier of the file A, to access the file A.

S1813: The electronic device B opens the file A by using the first application.

S1813 is similar to step S1310, and details are not described herein again.

In this embodiment of this application, the electronic device A may preferentially display an application in an electronic device that is in the device group and that has formed a distributed file system with the electronic device A. If the user chooses to open the file A by using an application in an electronic device that does not form a distributed file system with the electronic device A, the electronic device A may alternatively first establish a distributed file system with the electronic device, and then perform a subsequent step. In this way, a process in which the electronic device B accesses the file A shared by the electronic device A is more convenient and fast.

In some embodiments, Preferred manner 1 and Preferred manner 2 may alternatively be used in combination in the file sharing method in this embodiment of this application. For example, in the embodiment shown in FIG. 18, steps S1812 and S1813 may also be steps S1701 and S1703. In addition, in some embodiments, after step S1703 is performed, steps S1704 to S1709 may be further performed. This is not limited herein.

It can be understood that the electronic device in this embodiment of this application may be a mobile electronic device, or may be another type of electronic device, for example, a television, a computer, or a smart printer. This is not limited herein.

Figure 20:
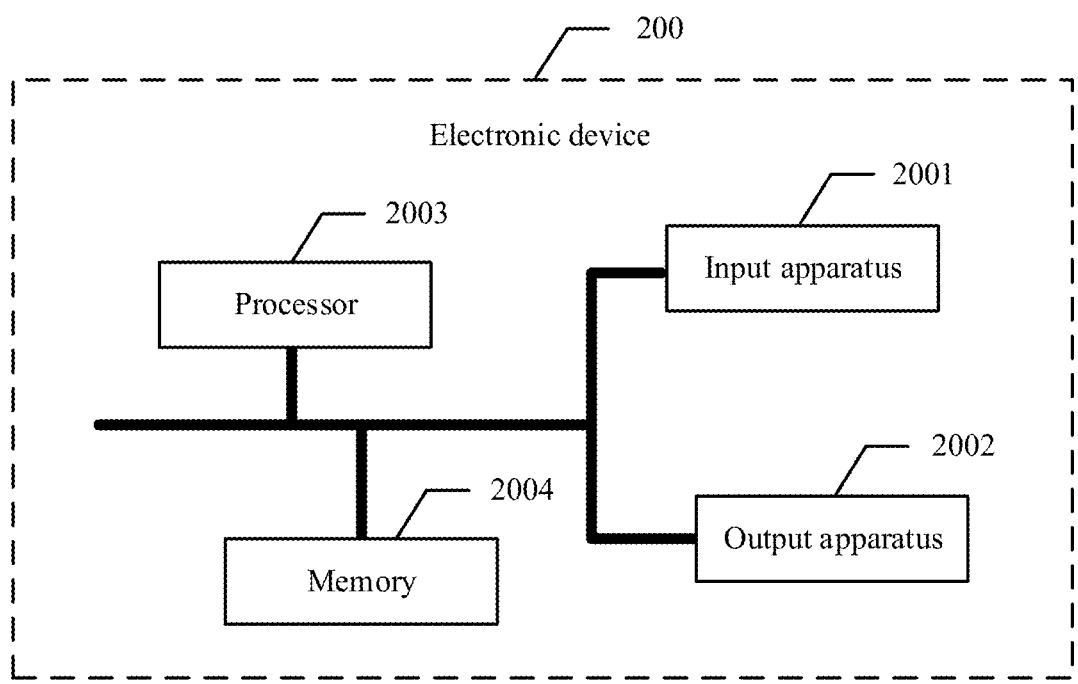
FIG. 20 is a schematic diagram of another structure of an example electronic device 200 according to an embodiment of this application.
Figure 21:
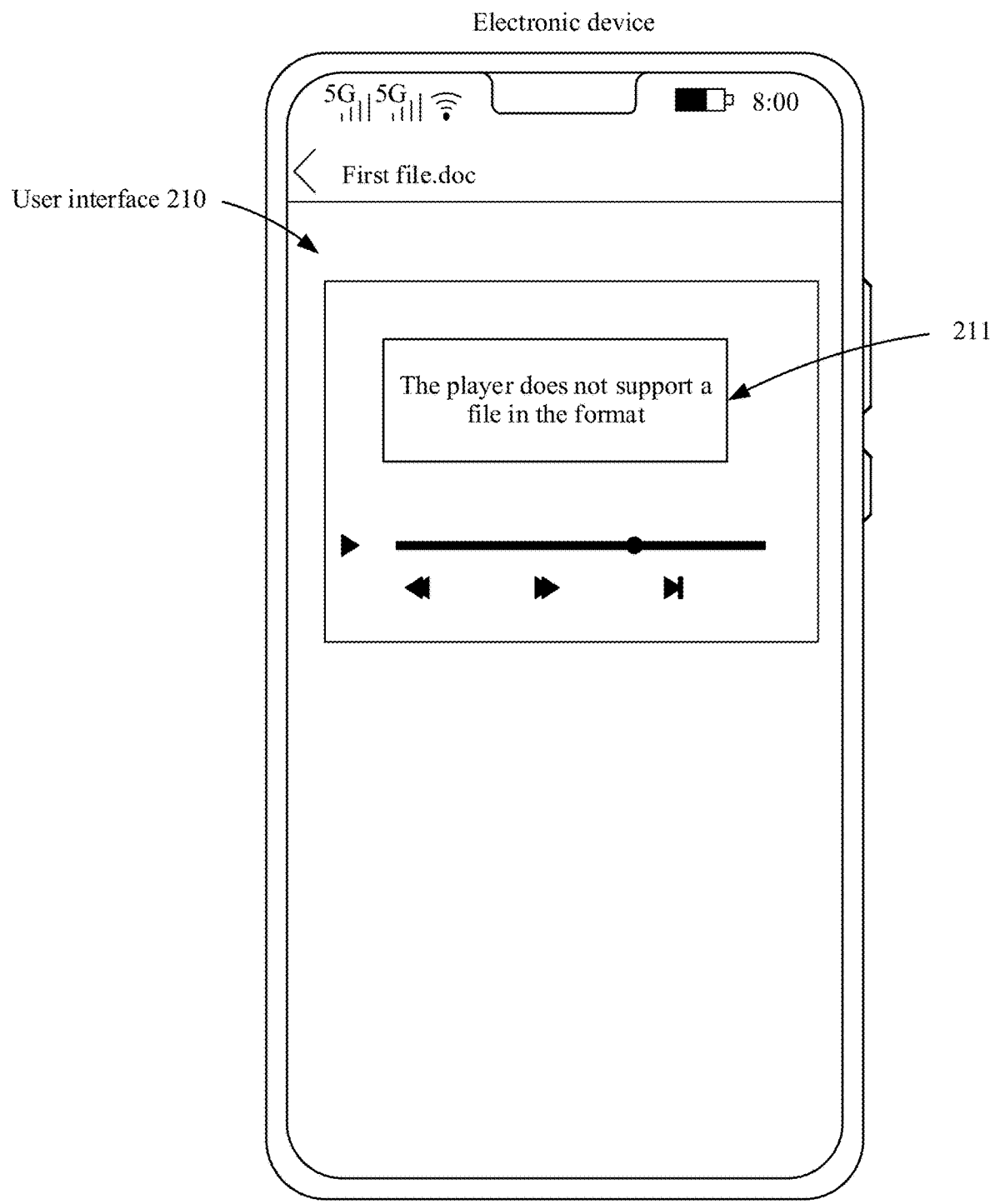
FIG. 21 is a schematic diagram of another user interface according to an embodiment of this application.
Figure 22:
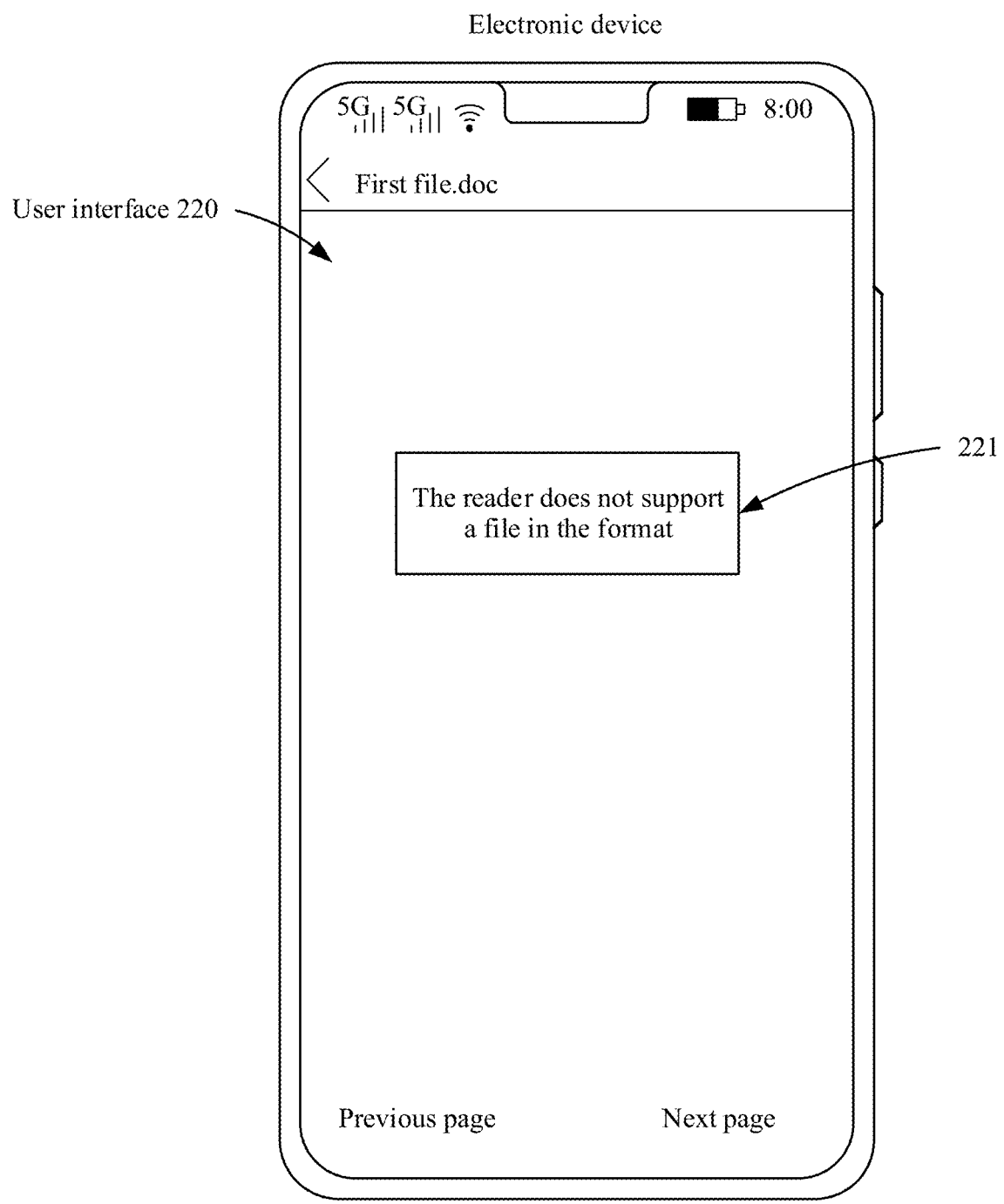
FIG. 22 is a schematic diagram of another user interface according to an embodiment of this application.
Figure 23:
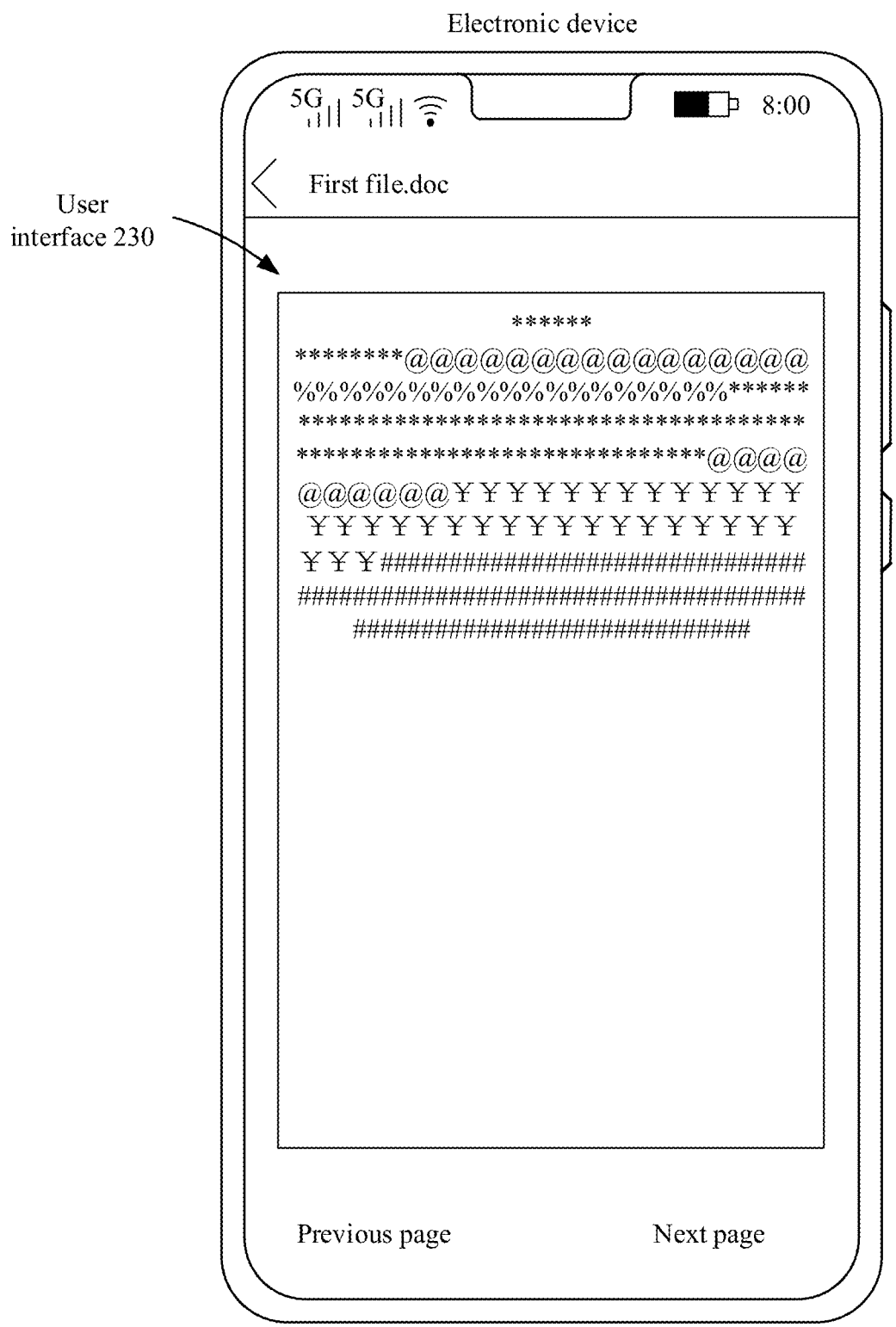
FIG. 23 is a schematic diagram of another user interface according to an embodiment of this application.
Figure 24:
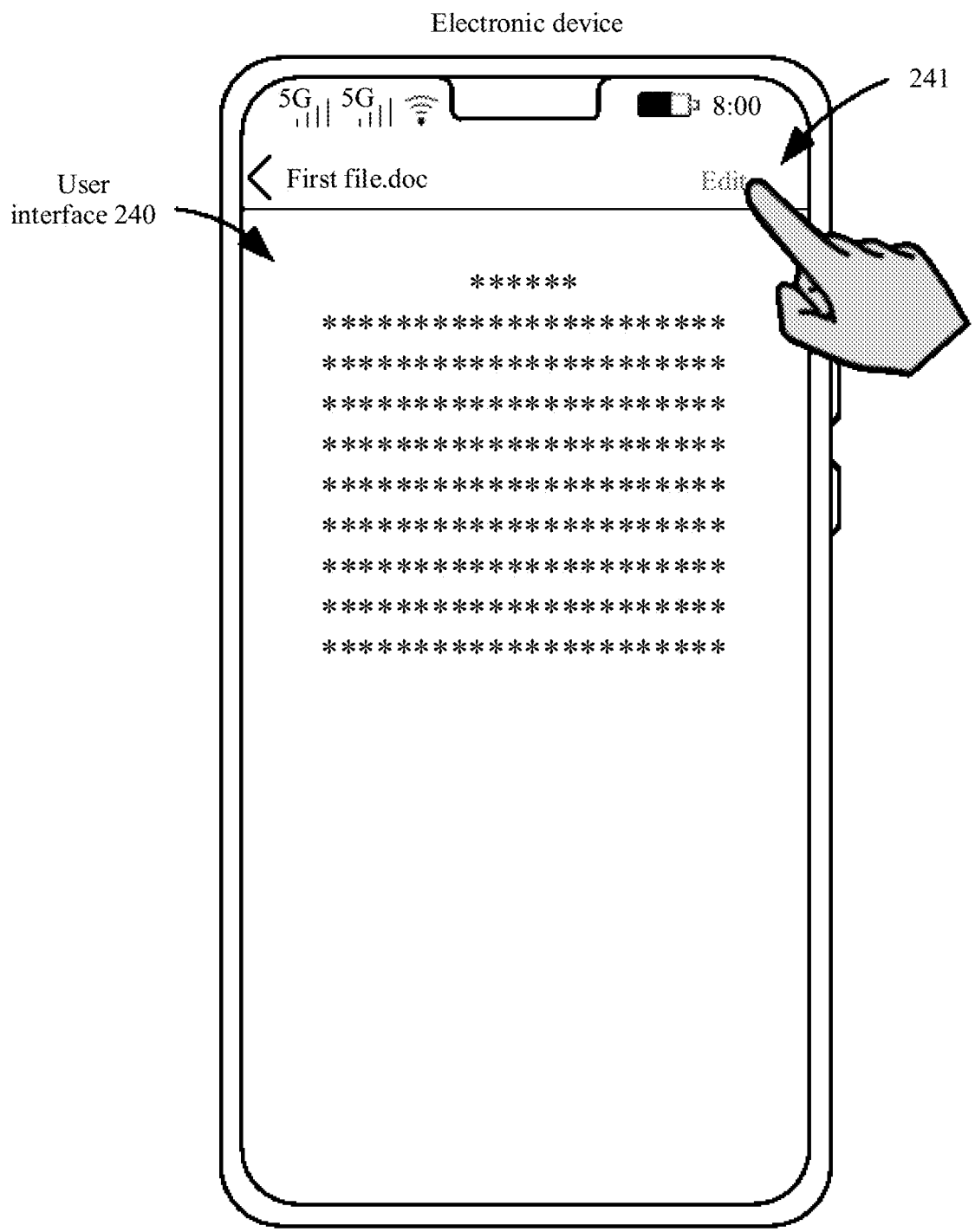
FIG. 24 is a schematic diagram of another user interface according to an embodiment of this application.
Figure 25:
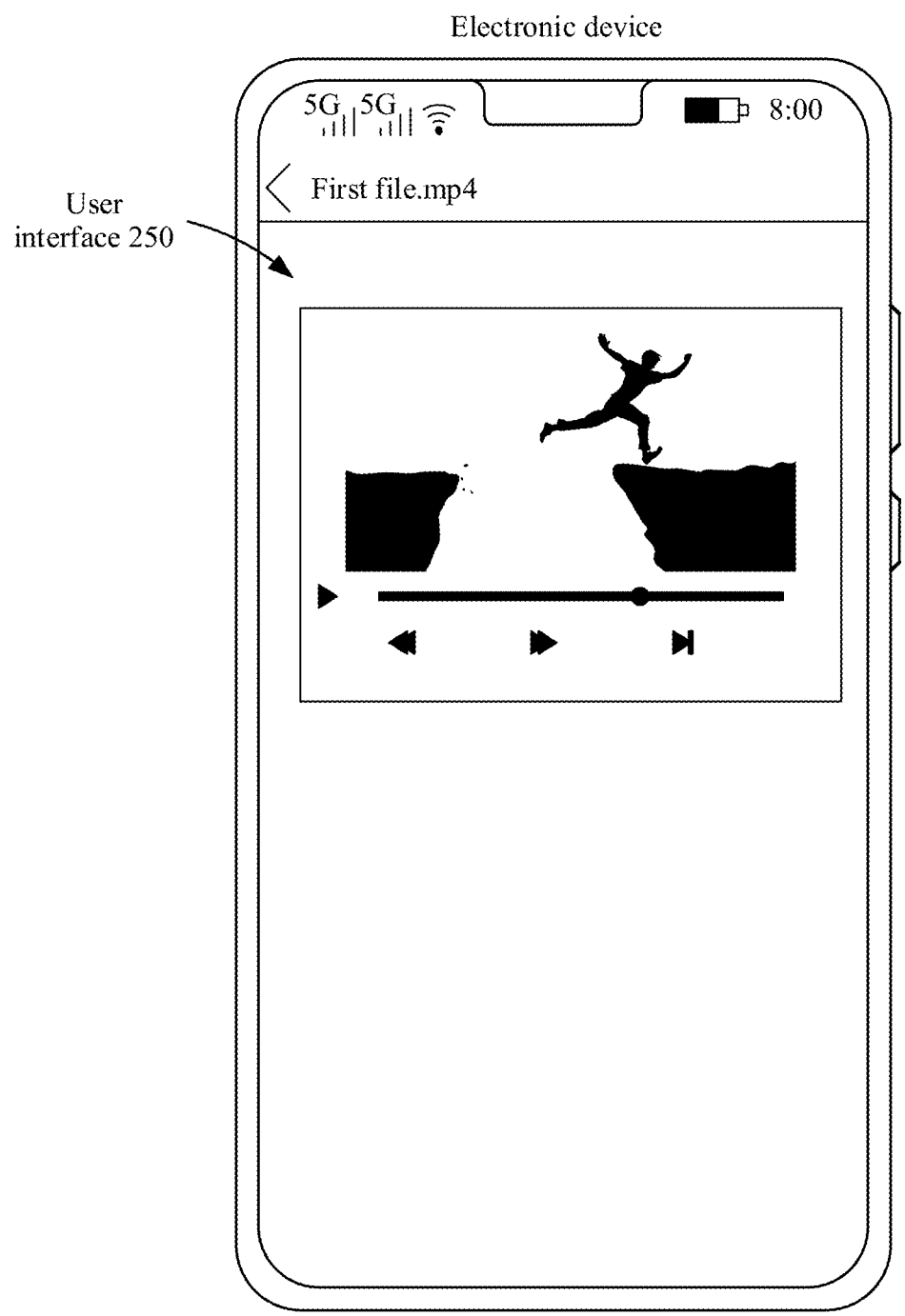
FIG. 25 is a schematic diagram of another user interface according to an embodiment of this application.

For example, FIG. 20 is a schematic diagram of another structure of an example electronic device 200 according to an embodiment of this application.

The electronic device 200 may include an input apparatus 2001, an output apparatus 2002, a processor 2003, and a memory 2004 (there may be one or more processors 2003 in the electronic device 200, and that there is one processor 2003 is used as an example in FIG. 20). In some embodiments of this application, the input apparatus 2001, the output apparatus 2002, the processor 2003, and the memory 2004 may be connected by using a bus or in another manner. That the input apparatus 2001, the output apparatus 2002, the processor 2003, and the memory 2004 are connected by using a bus is used as an example in FIG. 20.

The output apparatus 2002 may include a display. The processor 2003 invokes an operation instruction stored in the memory 2004, so that the electronic device 200 performs the file sharing method in embodiments of this application. A specific process is similar to a process in which the electronic device 100 performs the file sharing method in embodiments of this application. Details are not described herein again.

In the foregoing embodiment, an electronic device A, an electronic device B, and an electronic device C each may also be referred to as a first electronic device, a second electronic device, a third electronic device, or the like. This is not limited herein.

For example, in some embodiments, the electronic device A may be a first electronic device, the electronic device B may be a second electronic device, and the electronic device C may be a third electronic device. In some embodiments, the electronic device A may be a first electronic device, the electronic device B may be a third electronic device, and the electronic device C may be a second electronic device. In some embodiments, the electronic device A may be a first electronic device, the electronic device B may be a second electronic device, and the electronic device C may also be a second electronic device. In some embodiments, the electronic device A may be a second electronic device, the electronic device B may be a first electronic device, and the electronic device C may be a third electronic device. In some embodiments, the electronic device A may be a second electronic device, the electronic device B may be a third electronic device, and the electronic device C may be a first electronic device. In some embodiments, the electronic device A may be a second electronic device, the electronic device B may be a first electronic device, and the electronic device C may also be a second electronic device. In some embodiments, the electronic device A may be a second electronic device, the electronic device B may also be a second electronic device, and the electronic device C may be a first electronic device. In some embodiments, the electronic device A may be a third electronic device, the electronic device B may be a first electronic device, and the electronic device C may be a second electronic device. In some embodiments, the electronic device A may be a third electronic device, the electronic device B may be a second electronic device, and the electronic device C may be a first electronic device. There may alternatively be another correspondence between each of the electronic device A, the electronic device B, and the electronic device C and each of the first electronic device, the second electronic device, or the third electronic device. This is not limited herein.

It can be understood that steps performed by each electronic device in the foregoing embodiments are limited to only a specific scenario, and each electronic device in the device group may have a capability of performing any step in the foregoing embodiments. This is not limited herein.

In conclusion, the foregoing embodiments are merely intended for describing the technical solutions of this application, but not for limiting the technical solutions of this application. Although this application is described in detail with reference to the foregoing embodiments, a person of ordinary skill in the art should understand that modifications to the technical solutions recorded in the foregoing embodiments or equivalent replacements to some technical features thereof may still be made, without departing from the scope of the technical solutions of embodiments of this application.

As used in embodiments, depending on the context, the term "when" can be interpreted as "if . . .", "after . . .", "in response to determining that . . .", or "in response to detecting that . . .". Similarly, depending on the context, the phrase "when it is determined that . . ." or "if it is detected that . . . (a stated condition or event)" can be interpreted as "if it is determined that . . .", "in response to determining that . . .", "when it is detected that . . . (the stated condition or event)", or "in response to detecting that . . . (the stated condition or event)".

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, all or some procedures or functions in embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium that can be accessed by the computer, or a data storage device, for example, a server or a data center in which one or more usable media are integrated. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some procedures of the methods in embodiments may be implemented by a computer program instructing related hardware. The program may be stored in the computer-readable storage medium. When the program is executed, the procedures in the method embodiments may be performed. The storage medium includes any medium that can store program code such as a ROM, a random access memory RAM, a magnetic disk, or a compact disc.

What is claimed is:

1. A file sharing method, comprising:
displaying, by a first electronic device on a first user interface in response to a first operation, multiple applications associated with a first file in a first device set, wherein the multiple applications comprise a first application on a second electronic device and a second application on the first electronic device, wherein the second electronic device and the first electronic device are different electronic devices;
in response to an operation of selecting the first application from the multiple applications displayed on the first user interface:
creating, by the first electronic device, a first mapping file of the first file in a distributed file system, wherein access to the first mapping file points to the first file;
setting, by the first electronic device, access permission for the first mapping file to allow the first application on the second electronic device to access the first mapping file; and
sending, by the first electronic device, file access information of the first mapping file and an identifier of the first application to the second electronic device, so that the second electronic device opens the first mapping file by using the first application.

2. The method according to claim 1, wherein the identifier of the first application comprises at least one of an application name of the first application or a package name of the first application, and the file access information of the first mapping file comprises a path of the first file or a file name of the first file.

3. The method according to claim 1, wherein the method further comprises:
receiving, by the first electronic device, an operation request for the first mapping file that is sent by the second electronic device;
operating, by the first electronic device, the first file based on the operation request for the first mapping file, to obtain an operation result; and
returning, by the first electronic device to the second electronic device, an operation response carrying the operation result.

4. The method according to claim 1, wherein before the step of displaying, by the first electronic device in response to the first operation, the application associated with the first file in the first device set, the method further comprises:
receiving, by the first electronic device, first application association information sent by the second electronic device, wherein the first application association information comprises information that the first application is associated with a first file type, and the first file type is a file type of the first file.

5. The method according to claim 1, wherein before the step of displaying, by the first electronic device in response to the first operation, the application associated with the first file in the first device set, the method further comprises:

sending, by the first electronic device, second application association information to the second electronic device, wherein the second application association information comprises information that a third application is associated with a second file type, and the third application is an application on the first electronic device.

6. The method according to claim 1, wherein the first operation is an operation that the user shares/opens the first file on the first electronic device, and the first device set is an online electronic device in a device group.

7. The method according to claim 1, wherein the displaying, by a first electronic device in response to a first operation, an application associated with a first file in a first device set, wherein the application comprises a first application on a second electronic device comprises:
in response to the first operation, determining, by the first electronic device, that the online electronic device in the device group is the first device set;
querying, by the first electronic device, application association information, and determining an application associated with the first file in an electronic device in the first device set, wherein the application association information comprises an installed application in the first device set and information about a file type associated with the installed application; and
displaying, by the first electronic device, the application associated with the first file on the electronic device in the first device set, wherein the application comprises the first application on the second electronic device.

8. The method according to claim 1, wherein the first user interface further comprises a first identifier of the first electronic device and a second identifier of the second electronic device, the first application is displayed in a first area of the first user interface corresponding to the second identifier of the second electronic device, and the second application is displayed in a second area of the first user interface corresponding to the first identifier of the first electronic device.

9. The method according to claim 1, wherein the method further comprises:
storing, by the first electronic device, a correspondence that is among an electronic device, an online status, an installed application, and a file type associated with the installed application;
wherein the displaying, by the first electronic device on the first user interface in response to the first operation, the multiple applications associated with the first file in the first device set comprises:
displaying, by the first electronic device on the first user interface in response to the first operation, the multiple applications associated with the first file in the first device set according to the correspondence that is currently stored in the first electronic device, and
wherein the multiple applications are associated with a file type of the first file.

10. The method according to claim 1, wherein the method further comprises:
periodically sending, by the first electronic device, a heartbeat detection signal to devices in the first device set;
receiving, by the first electronic device, a response of the second electronic device to the heartbeat detection signal;
determining, by the first electronic device in response to receiving the response, that the second electronic device is in an online state.

11. The method according to claim 10, wherein the method further comprises:
    displaying, by the first electronic device on the first user interface in response to the first operation, the first application on the second electronic device when the second electronic device is in an online state.

12. A first electronic device, wherein the first electronic device comprises one or more processors and a memory, wherein
    the memory is coupled to the one or more processors, the memory is configured to store computer program code, the computer program code comprises computer instructions, and the one or more processors invoke the computer instructions, so that the first electronic device performs the following operations:
    displaying, on a first user interface in response to a first operation, multiple applications associated with a first file in a first device set, wherein the multiple applications comprise a first application on a second electronic device and a second application on the first electronic device, wherein the second electronic device and the first electronic device are different electronic devices;
    in response to an operation of selecting the first application from the multiple applications displayed on the first user interface:
        creating, by the first electronic device, a first mapping file of the first file in a distributed file system, wherein access to the first mapping file points to the first file;
        setting, by the first electronic device, access permission for the first mapping file to allow the first application on the second electronic device to access the first mapping file; and
        sending file access information of the first mapping file and an identifier of the first application to the second electronic device, so that the second electronic device opens the first mapping file by using the first application.

13. The first electronic device according to claim 12, wherein the first user interface further comprises a first identifier of the first electronic device and a second identifier of the second electronic device, the first application is displayed in a first area of the first user interface corresponding to the second identifier of the second electronic device, and the second application is displayed in a second area of the first user interface corresponding to the first identifier of the first electronic device.

14. The first electronic device according to claim 12, wherein when the one or more processors invoke the computer instructions, the first electronic device further performs the following operations:
    store a correspondence that is among an electronic device, an online status, an installed application, and a file type associated with the installed application;
    display on the first user interface in response to the first operation, multiple applications associated with the first file in the first device set according to the correspondence that is currently stored in the first electronic device, and
    wherein the multiple applications are associated with a file type of the first file.

15. The first electronic device according to claim 12, wherein when the one or more processors invoke the computer instructions, the first electronic device further performs the following operations:
    periodically send a heartbeat detection signal to devices in the first device set;
    receive a response of the second electronic device to the heartbeat detection signal;
    determine, in response to receiving the response, that the second electronic device is in an online state.

16. The first electronic device according to claim 15, wherein when the one or more processors invoke the computer instructions, the first electronic device further performs the following operations:
    display, on the first user interface in response to the first operation, the first application on the second electronic device when the second electronic device is in an online state.

* * * * *